US012062460B2

(12) United States Patent
Loewen et al.

(10) Patent No.: US 12,062,460 B2
(45) Date of Patent: Aug. 13, 2024

(54) APPARATUS WITH FLOW ASSEMBLY INCLUDING TEMPERATURE SENSORS AND HEATING ELEMENT

(71) Applicant: GE-Hitachi Nuclear Energy Americas LLC

(72) Inventors: Eric Paul Loewen, Wilmington, NC (US); Hanying Liu, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 121 days.

(21) Appl. No.: 17/535,069

(22) Filed: Nov. 24, 2021

(65) Prior Publication Data

US 2022/0084702 A1 Mar. 17, 2022

Related U.S. Application Data

(62) Division of application No. 15/178,020, filed on Jun. 9, 2016, now abandoned.

(51) Int. Cl.
*G21C 17/112* (2006.01)
*G01F 1/68* (2006.01)
(Continued)

(52) U.S. Cl.
CPC ............ *G21C 17/022* (2013.01); *G01F 1/68* (2013.01); *G21C 17/032* (2013.01); *G21C 17/10* (2013.01); *G21C 17/112* (2013.01)

(58) Field of Classification Search
CPC .... G21C 17/022; G21C 17/032; G21C 17/10; G21C 17/112; G01F 1/00
See application file for complete search history.

(56) References Cited

U.S. PATENT DOCUMENTS 3,158,543 A  11/1964 Sherman
3,802,264 A  4/1974 Poppendiek et al.
(Continued)

FOREIGN PATENT DOCUMENTS

GB  1095476 A  * 12/1967
JP  S5157339 A  5/1976
(Continued)

OTHER PUBLICATIONS

Hasanein, Hisham, Chan, A. M. C., Kawaji, M, and Yoshioka, Y., "Steam-Water Two-Phase Flow in Large Diameter Vertical Piping at High Pressures and Temperatures", ICONE, vol. 1—Part B, ASME, 1996.
(Continued)

*Primary Examiner* — Lily C Garner
(74) *Attorney, Agent, or Firm* — Harness, Dickey & Pierce, P.L.C.

(57) ABSTRACT

The apparatus includes a flowmeter coupled a surface exposed to a flow channel. The flowmeter monitors a flow of coolant. The flowmeter includes a first temperature sensor that generates first temperature data based on measuring a first temperature of a first flowstream, a heating element coupled to the first temperature sensor where the heating element applies heat to the first temperature sensor through an interface, a second temperature sensor generates second temperature data based on measuring a second temperature of a second flowstream, the second temperature sensor being spaced apart from the heating element, and the second temperature sensor being at least partially insulated from the heating element so the second temperature data generated by the second temperature sensor is independent of heat generated by the heating element. A processor calculates a flowrate of the coolant based on the second temperature data and a temperature of the coolant fluid.

14 Claims, 7 Drawing Sheets

(51) Int. Cl.
    *G21C 17/022*      (2006.01)
    *G21C 17/032*      (2006.01)
    *G21C 17/10*      (2006.01)

(56) References Cited

U.S. PATENT DOCUMENTS

| | | | |
|---|---|---|---|
| 4,440,717 A * | 4/1984 | Bevilacqua | G01F 23/246 376/258 |
| 4,604,902 A | 8/1986 | Sabin et al. | |
| 5,265,478 A | 11/1993 | McKay et al. | |
| 5,559,293 A | 9/1996 | Kirkpatrick | |
| 7,054,767 B2 | 5/2006 | Eldridge | |
| 7,337,661 B2 | 3/2008 | Yamada et al. | |
| 7,926,345 B2 * | 4/2011 | Kaercher | G01F 23/248 73/295 |
| 8,069,718 B2 | 12/2011 | Nakano et al. | |
| 8,225,652 B2 | 7/2012 | Muraoka et al. | |
| 8,616,053 B2 * | 12/2013 | Niedzballa | G01F 23/247 73/295 |
| 2004/0163464 A1 | 8/2004 | Nakada et al. | |
| 2007/0201601 A1 * | 8/2007 | Oda | G21C 17/12 376/259 |
| 2009/0293608 A1 | 12/2009 | Kaercher et al. | |
| 2011/0088465 A1 | 4/2011 | Niedzballa | |
| 2012/0087455 A1 | 4/2012 | Hyde et al. | |

FOREIGN PATENT DOCUMENTS

| | | |
|---|---|---|
| JP | S6093919 A | 5/1985 |
| JP | S63165716 A | 7/1988 |
| JP | H06341879 A | 12/1994 |
| JP | 2003/247876 A | 9/2003 |
| JP | 2005/233693 A | 9/2005 |
| JP | 2007/078559 A | 3/2007 |
| JP | 2008/20237 A | 1/2008 |
| JP | 2008/082966 A | 4/2008 |
| JP | 2008082966 A * | 4/2008 |
| JP | 2013/534991 A | 9/2013 |
| JP | 2014/530364 A | 11/2014 |
| JP | 5629375 B2 | 11/2014 |
| WO | WO-1995032406 A1 | 11/1995 |
| WO | WO-0135421 A1 * | 5/2001    ............ G01F 23/22 |

OTHER PUBLICATIONS

Kataoka, I. and Ishii, M.: "Drift Flux Model for Large Diameter Pipe and New Correlation for Pool Void Fraction", *Int. J. Heat Mass Transfer*, 30, 1927-1939 (1987).
International Search Report and Written Opinion for PCT Application No. PCT/US2017/036672 dated Mar. 28, 2018.
Office Action dated Sep. 24, 2019, issued in corresponding Canadian Patent Application No. 3,026,749.
Office Action dated Nov. 27, 2019, issued in corresponding Japanese Patent Application No. 2018-564402.
Office Action dated Apr. 28, 2020, issued in corresponding European Patent Application No. 17829061.5.
Office Action dated Jun. 23, 2020, issued in corresponding Japanese Patent Application No. 2018-564402.
Office Action dated Aug. 12, 2020, issued in corresponding Canadian Patent Application No. 3,026,749.
Japanese Decision of Refusal dated Nov. 10, 2020, issued in corresponding Japanese Patent Application No. 2018-564402.
Office Action dated Jun. 17, 2021, issued in corresponding European Patent Application No. 17829061.5.
Japanese Decision of Refusal dated Mar. 29, 2022, issued in corresponding Japanese Patent Application No. 2021-038590.
Japanese Decision of Refusal dated Aug. 8, 2023, issued in corresponding Japanese Patent Application No. 2022-183723.

* cited by examiner

APPARATUS WITH FLOW ASSEMBLY INCLUDING TEMPERATURE SENSORS AND HEATING ELEMENT

CROSS-REFERENCE TO RELATED APPLICATIONS

This U.S. non-provisional patent application is a divisional of U.S. application Ser. No. 15/178,020, filed on Jun. 9, 2016, the entire contents of which is hereby incorporated by reference.

BACKGROUND

Field

Example embodiments described herein relate in general to nuclear reactors and in particular to monitoring fluid circulation through a reactor core of a nuclear reactor.

Description of Related Art

Nuclear reactors may be configured to be cooled via heat transfer to one or more coolant fluids circulated through the core. Such heat transfer may be referred to herein as heat rejection by the nuclear reactor core. Various coolant fluids may be utilized to remove heat from the nuclear reactor core. A coolant fluid may be a fluid that includes one or more various substances, including water, liquid metal, molten salt, a gaseous substance, some combination thereof, etc.

In some nuclear plants, a nuclear reactor includes an assembly defining an annular flow channel around a nuclear reactor core. The nuclear reactor core may be separated from the annular flow channel by a core shroud assembly. The annular flow channel may be referred to as a downcomer flow channel. Coolant fluid may be supplied into the downcomer flow channel from a coolant fluid loop. Supplied "cold" coolant fluid may circulate downwards through the downcomer flow channel to a lower portion of the nuclear reactor. The cold coolant fluid may circulate under a lower portion of the core shroud assembly to circulate upwards through a core flow channel in flow communication with the nuclear reactor core.

In some nuclear plants, a coolant fluid may be circulated through a nuclear reactor through natural circulation. For example, coolant fluid may circulate downwards through the downcomer flow channel and upwards through the core flow channel through natural circulation-driven flow.

In some cases, the operation of a nuclear reactor may be controlled via controlling one or more of coolant fluid flow rate through the core flow channel.

SUMMARY

Various embodiments described herein relate a thermal monitoring array configured to generate temperature data associated with a coolant fluid based on measuring temperatures of at least two flowstreams of the coolant fluid through a downcomer flow channel in the nuclear reactor. The temperature data may be used to determine a flow rate of the coolant fluid through the downcomer flow channel, a temperature of the coolant fluid at one or more locations in the downcomer flow channel, a phase of the coolant fluid at one or more locations in the downcomer flow channel, and a location of a fluid two-phase interface in the downcomer flow channel. Nuclear reactor operations may be controlled based on at least one of the determined flow rate of fluid through the downcomer flow channel, a temperature distribution of the coolant fluid through the downcomer flow channel, and a location of a fluid two-phase interface in the downcomer flow channel.

According to some example embodiments, a nuclear reactor may include a reactor core, a downcomer assembly, a thermal monitoring array, and a control system. The downcomer assembly may at least partially define an annular downcomer flow channel. The downcomer assembly may be configured to direct a coolant fluid to the nuclear reactor core via the annular downcomer flow channel. The thermal monitoring array may include at least one flowmeter assembly. The at least one flowmeter assembly may be coupled to at least one surface of the downcomer assembly such that the at least one flowmeter assembly is exposed to at least a portion of the downcomer flow channel. The flowmeter assembly may include a first temperature sensor configured to generate first temperature data based on measuring a temperature of a first flowstream of the coolant fluid in the portion of the downcomer flow channel, a heating element coupled to the first temperature sensor such that the heating element is operable to apply heat to the first temperature sensor, and a second temperature sensor configured to generate second temperature data based on measuring a temperature of a second flowstream of the coolant fluid in the portion of the downcomer flow channel, the second temperature sensor being at least partially insulated from the heating element. The control system may be configured to determine a flow rate of the coolant fluid through the downcomer flow channel based on at least the first and second temperature data.

In some example embodiments, the first and second flowstreams may be a common flowstream such that at least one temperature sensor of the first and second temperature sensors is upstream of another temperature sensor of the first and second temperature sensors.

In some example embodiments, the control system may be configured to determine a temperature difference based on the first and second temperature data and determine the flow rate based on the temperature difference, a magnitude of electrical power supplied to the heating element, and a surface area of an interface between the heating element and the first temperature sensor.

In some example embodiments, the flowmeter assembly may include at least one third temperature sensor, the at least one third temperature sensor being configured to generate third temperature data based on measuring a temperature of at least one flowstream of the coolant fluid in the downcomer flow channel, the at least one third temperature sensor being at least partially insulated from the heating element.

In some example embodiments, the thermal monitoring array may include a plurality of flowmeter assemblies, at least two flowmeter assemblies of the plurality of flowmeter assemblies being exposed to separate portions of the downcomer flow channel.

In some example embodiments, the at least two flowmeter assemblies may be exposed to at least one of axially-separated portions of the downcomer flow channel, relative to a longitudinal axis of the downcomer flow channel and azimuthally-separated portions of the downcomer flow channel, relative to the longitudinal axis of the downcomer flow channel.

In some example embodiments, the control system may be configured to determine a temperature of fluid flowing in the at least one portion of the downcomer flow channel based on the first and second temperature data.

In some example embodiments, the control system may be configured to determine a phase of fluid flowing in the at least one portion of the downcomer flow channel based on the first and second temperature data.

In some example embodiments, the nuclear reactor may be at least one of a pressurized water reactor and a boiling water reactor.

In some example embodiments, the thermal monitoring array may include a flow channel cover configured to direct at least the first and second fluid flowstreams in flow communication with the at least one flowmeter assembly and in isolation from a remainder of the downcomer flow channel.

According to some example embodiments, an apparatus may include a flowmeter assembly. A flowmeter assembly may be configured to be coupled to at least one surface such that the at least one flowmeter assembly is exposed to at least a portion of a flow channel. The flowmeter assembly may include a first temperature sensor configured to generate first temperature data based on measuring a temperature of a first flowstream of the coolant fluid in the portion of the flow channel, a heating element coupled to the first temperature sensor such that the heating element is operable to apply heat to the first temperature sensor, and a second temperature sensor configured to generate second temperature data based on measuring a temperature of a second flowstream of the coolant fluid in the portion of the flow channel, the second temperature sensor being at least partially insulated from the heating element.

In some example embodiments, the first and second flowstreams may be configured to be exposed to a common flowstream. At least one temperature sensor of the first and second temperature sensors may be upstream of another temperature sensor of the first and second temperature sensors in the portion of the flow channel.

In some example embodiments, the flowmeter assembly may include insulating material configured to at least partially insulate the second temperature sensor from the heating element, the insulating material being packed around the heating element and at least a portion of the first temperature sensor.

In some example embodiments, the flowmeter assembly may include at least one third temperature sensor, the at least one third temperature sensor being configured to generate third temperature data based on measuring a temperature of at least one flowstream of the coolant fluid in the flow channel, the at least one third temperature sensor being at least partially insulated from the heating element.

In some example embodiments, the at least one third temperature sensor and the second temperature sensor may be configured to be exposed to at least one of axially-separated portions of the flow channel, relative to a longitudinal axis of the flow channel, and azimuthally-separated portions of the flow channel, relative to the longitudinal axis of the flow channel.

In some example embodiments, the apparatus may include a flow channel cover configured to at least partially define the first and second fluid flowstreams and isolate the first and second temperature sensors from a remainder portion of the flow channel.

According to some example embodiments, a method may include generating first temperature data at a first temperature sensor, generating second temperature data at a second temperature sensor, and communicating the first temperature data and the second temperature data to a remotely-located computer processing device. The first temperature data may be generated based on both a temperature of a first flowstream of a coolant fluid and heat transfer to the first temperature sensor from a heating element. The heating element may be directly coupled to the first temperature sensor at an interface such that the heat transfer is through the interface. The first temperature data may indicate a first temperature measured by the first temperature sensor. The second temperature data may be generated based on a temperature of a second flowstream of the coolant fluid in the flow channel and substantially independently of heat generated by the heating element. The second temperature sensor may be at least partially insulated from the heating element. The second temperature data may indicate a second temperature measured by the second temperature sensor.

In some example embodiments, the method may include determining a flow rate of the coolant fluid through the flow channel based on the first and second temperature data and controlling heat rejection by a nuclear reactor core based on the determined flow rate of the coolant fluid through the flow channel. The determining may include determining a temperature difference between the first temperature and the second temperature and determining the flow rate of the coolant fluid based on the temperature difference, a surface area of the interface, and a rate of the heat transfer through the interface.

In some example embodiments, the method may include determining a location of a fluid two-phase interface in the flow channel based on the first and second temperature data and controlling a flow rate of the coolant fluid through one or more portions of the flow channel based on the determined location of the fluid two-phase interface in the flow channel. The determining may include determining a temperature difference between the first temperature and the second temperature and determining a phase of the coolant fluid in at least one of the first and second flowstreams based on the temperature difference.

In some example embodiments, the method may include determining a coolant fluid temperature distribution through one or more portions of the flow channel based on the first and second temperature data and controlling a flow rate of the coolant fluid through one or more portions of the flow channel based on the determined fluid temperature distribution through the one or more portions of the flow channel.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
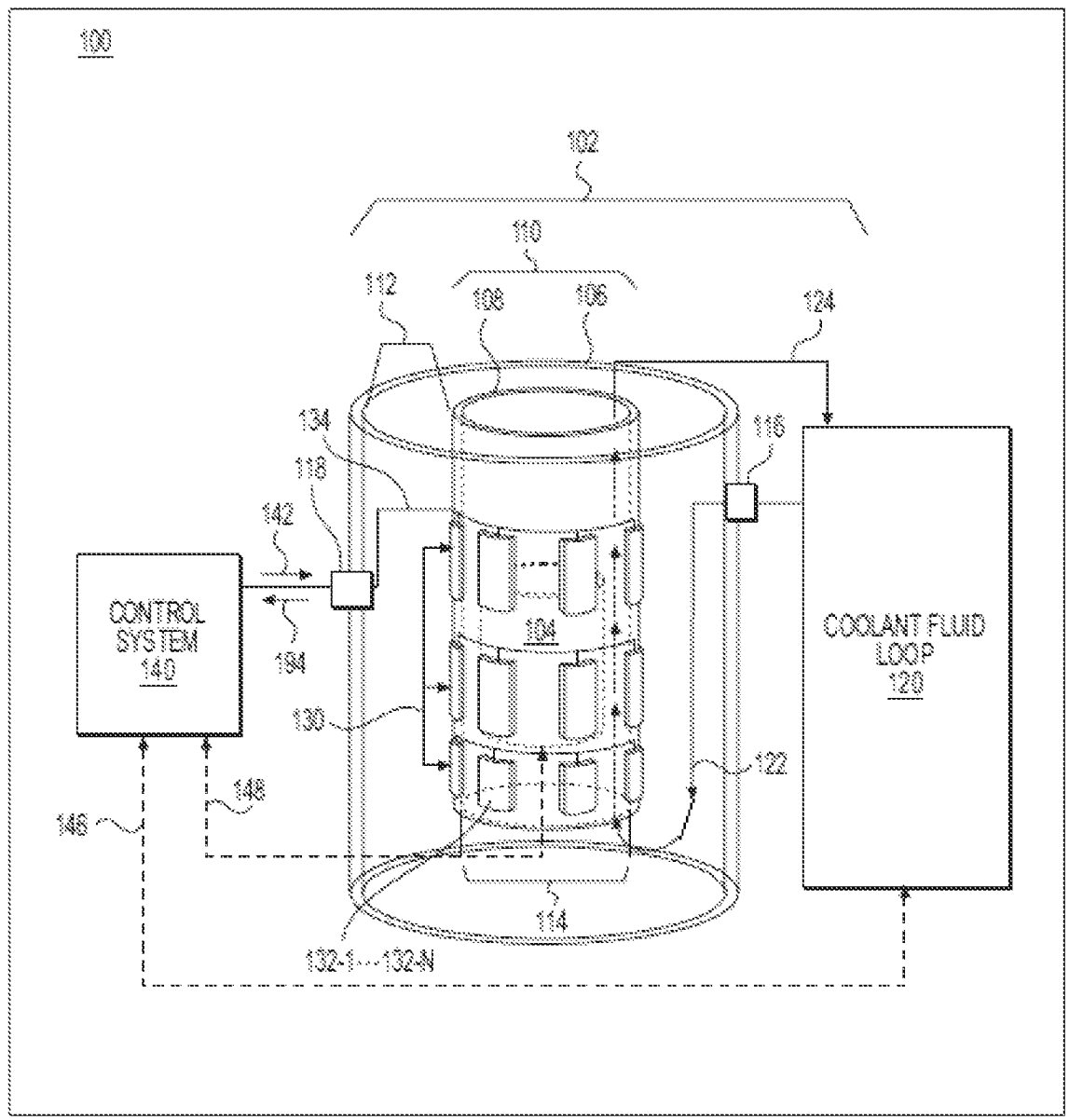
FIG. 1 is a schematic view of a nuclear plant that includes a thermal monitoring array, according to some example embodiments.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Units, systems, and/or devices according to one or more example embodiments may be implemented using one or more instances of hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), an application-specific integrated circuit (ASIC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The present disclosure relates to a unique thermal monitoring array configured to monitor at least one of a coolant fluid flow rate through a reactor core of a nuclear reactor, a temperature of coolant fluid in one or more portions of a downcomer flow channel of the nuclear reactor, and a location of a fluid two-phase interface in the downcomer flow channel. The downcomer flow channel may be an annular downcomer flow channel. The thermal monitoring array includes a set of one or more flowmeter assemblies coupled to one or more surfaces defining the downcomer flow channel, such that each flowmeter assembly is exposed to a separate portion of the downcomer flow channel and is configured to generate temperature data associated with fluid flow in the separate portion of the downcomer flow channel.

A control system may receive temperature data from the separate flowmeter assemblies included in the array. The control system may determine one or more of fluid flow rates through one or more portions of the downcomer flow channel, temperatures of coolant fluid in one or more portions of the downcomer flow channel, and a location of a fluid two-phase interface in a downcomer flow channel based on temperature data generated by separate, respective flowmeter assemblies exposed to the separate, respective portions of the downcomer flow channel.

A flowmeter assembly may include at least first and second temperature sensors configured to generate temperature data based on measuring temperatures of respective first and second flowstreams of coolant fluid through a portion of a downcomer flow channel. A heating element is coupled to a first temperature sensor in the flowmeter assembly, and a second temperature sensor in the flowmeter assembly is at least partially insulated from the heating element.

A control system may calculate flow rates (e.g., mass flow rate, volumetric flow rate, etc.) of coolant fluid through each of separate portions of a downcomer flow channel of the nuclear reactor based on the temperature data generated by the sensors of the flowmeter assemblies of the array. Based on determining the flow rates, the control system may adjust coolant fluid flow rates to optimize nuclear reactor heat rejection by the coolant fluid flow through the nuclear reactor. As a result, nuclear reactor performance and efficiency may be improved. In addition, based on monitoring at least one of a location of a fluid two-phase interface in the flow channel and temperatures of coolant fluid in the various portions of the downcomer flow channel, the control system may manage coolant fluid circulation through the nuclear reactor to mitigate a probability of the level of liquid fluid dropping below a threshold level, mitigate asymmetrical coolant flow through the nuclear reactor, mitigate asymmetric heat rejection by the nuclear reactor core, some combination thereof, etc. As a result, operations of the nuclear reactor may be improved.

In some example embodiments, the control system may manage coolant fluid circulation based on determining a flow rate of the coolant fluid through the nuclear reactor core.

In some example embodiments, the control system may manage coolant fluid circulation based on determining at least one of a temperature distribution of the coolant fluid through a downcomer flow channel of the nuclear reactor. Based on such determining, the control system may manage coolant fluid circulation to improve uniformity of coolant fluid temperature through multiple portions of the flow channel. Such improved uniformity may result in uniform reactor core heat rejection. Thus, managing coolant fluid circulation to improve coolant fluid temperature uniformity may improve nuclear reactor performance and safety.

FIG. 1 is a schematic view of a nuclear plant that includes a thermal monitoring array, according to some example embodiments.

Nuclear power plant 100 includes a nuclear reactor 102, a coolant fluid circulation loop 120, and a control system 140. In some example embodiments, a nuclear reactor includes an assembly that defines a flow channel through at least a portion of the nuclear reactor. A coolant fluid may be circulated through the flow channel. In the example embodiment shown in FIG. 1, for example, nuclear reactor 100 includes a nuclear reactor core 104 and a downcomer assembly 110 that defines an annular downcomer flow channel 112 around the nuclear reactor core 104 and a core flow channel 114 in which the nuclear reactor core 104 is included. The downcomer assembly 110 includes a wall 106 of a nuclear reactor pressure vessel that defines an outer boundary of the downcomer flow channel 112. The downcomer assembly 110 includes a core shroud 108 that defines an inner boundary of the downcomer flow channel 112. The core shroud 108 isolates the nuclear reactor core 104 from the downcomer flow channel 112.

In some example embodiments, the nuclear reactor 102 may be at least one of a pressurized water reactor (PWR) and a boiling water reactor (BWR). In some example embodiments, the nuclear reactor 102 is an economic simplified boiling water reactor (ESBWR).

In some example embodiments, a nuclear reactor is configured to reject heat from the nuclear reactor core through circulation of a coolant fluid from a coolant fluid loop through the nuclear reactor. In the example embodiment shown in FIG. 1, for example, the nuclear reactor 102 is configured to reject heat from reactor core 104 through circulation of coolant fluid 122, 124 from coolant fluid circulation loop 120 through the nuclear reactor 102. As shown in FIG. 1, "cold" coolant fluid 122 may be introduced into the downcomer flow channel 112 from the coolant fluid circulation loop 120 via one or more nozzles 116 and the introduced coolant fluid 122 may flow downwards through the downcomer flow channel 112 to a lower portion of the nuclear reactor 102.

The nozzles 116 may be spaced at separate azimuthal locations around the wall 106 such that coolant 122 is introduced to azimuthally-separate portions of the downcomer flow channel 112 at multiple, azimuthally-separate locations of the wall 106. Introduction of coolant fluid 122 at multiple locations around the circumference of the downcomer flow channel 112 may improve uniformity of coolant fluid 122 circulating through the nuclear reactor 102. In some example embodiments, a nuclear reactor 102 includes at least six (6) nozzles 116 spaced equidistantly around the downcomer flow channel 112. In the example embodiment illustrated in FIG. 1, the nozzles 116 may be located proximate to an upper portion of the downcomer assembly 110, such that coolant fluid 122 is introduced into an upper portion of the downcomer flow channel 112 and flows downwards through the downcomer flow channel 112 to a lower portion of the nuclear reactor 102.

The lower portion of the nuclear reactor 102 may be located beneath a lower portion of the core shroud 108 such that coolant fluid 122 in the lower portion of the nuclear reactor 102 is in flow communication with the core flow channel 114. As shown in FIG. 1, upon arriving at the lower portion of the nuclear reactor 102 from the downcomer flow channel 112, the coolant fluid 122 may flow upwards through the core flow channel 114 so that the coolant fluid 122 absorbs heat generated by the nuclear reactor core 104 and thus becomes "hot" coolant fluid 124. The hot coolant fluid 124 may flow to an upper portion of the core flow channel 114 at least partially defined by the core shroud 108. The hot coolant fluid 124 may exit the nuclear reactor 102 from an upper portion of the core flow channel 114 and return to the coolant fluid circulation loop 120. The coolant fluid 124 may be regenerated to be cold coolant fluid 122 in the coolant fluid circulation loop 120.

In some example embodiments, the nuclear reactor 102 is configured to circulate coolant fluid 122, 124 through the flow channels 112, 114 via natural circulation. Natural circulation may include coolant fluid 122, 124 circulating through the flow channels 112, 114 based at least in part upon convection, such that convection drives coolant fluid 122, 124 flow through the flow channels 112, 114. For example, the relatively colder coolant fluid 122 may flow to a lower portion of the nuclear reactor 102 through the downcomer flow channel 112. The colder coolant fluid 122 may displace warmer coolant fluid 124 in the core flow channel 114 to an upper portion of the nuclear reactor 102. As a result, the coolant fluid 124 removes heat rejected from the nuclear reactor core 104 from the nuclear reactor 102.

In some example embodiments, the nuclear reactor 102 includes a thermal monitoring array 130 configured to generate temperature data that may be processed to monitor at least one of a flow rate of coolant fluid 122, 124 through the core flow channel 114 of the nuclear reactor 102, a temperature distribution of coolant fluid 122 in the downcomer flow channel 112, and a location of a fluid two-phase interface (i.e., coolant fluid 122 liquid level) in the downcomer flow channel 112. A flow rate of coolant fluid 122, 124 through the core flow channel 114 of the nuclear reactor 102 may be referred to herein as the core flow, core flow rate, etc. In some example embodiments, a flow rate of coolant fluid includes at least one of a mass flow rate and a volumetric flow rate. In some example embodiments, the core flow equates with the total flow rate of coolant fluid 122 through the downcomer flow channel 112.

The thermal monitoring array 130 may include a set of one or more flowmeter assemblies 132-1 to 132-N coupled to one or more surfaces of the downcomer assembly 110 such that the one or more flowmeter assemblies 132-1 to 132-N are exposed to one or more portions of the downcomer flow channel 112. As used herein, "N" is a positive integer having a value of at least one (1).

Flowmeter assemblies 132-1 to 132-N exposed to separate portions of the downcomer flow channel 112 may generate temperature data associated with separate portions of the downcomer flow channel 112. As shown in FIG. 1, for example, the thermal monitoring array 130 includes multiple flowmeter assemblies 132-1 to 132-N coupled to separate portions of the outer surface of the core shroud 108, such that each of the flowmeter assemblies 132-1 to 132-N is exposed to a separate portion of the downcomer flow channel 112. Thus, each of the flowmeter assemblies 132-1 to 132-N is configured to generate temperature data associated with a separate portion of the downcomer flow channel 112.

As described further below with reference to FIG. 4 and FIG. 5, each of the flowmeter assemblies 132-1 to 132-N is exposed to at least one portion of the downcomer flow channel 112. A given flowmeter assembly of flowmeter assemblies 132-1 to 132-N therefore may be exposed to one or more flowstreams of coolant fluid 122 through the at least one portion of the downcomer flow channel 112. The given flowmeter assembly of flowmeter assemblies 132-1 to 132-N therefore may be configured to generate temperature data based on monitoring the one or more flowstreams of coolant fluid 122 flowing through the at least one portion of the downcomer flow channel 112.

The temperature data generated by at least one of flowmeter assemblies 132-1 to 132-N may be processed to determine at least one of a flow rate of coolant fluid 122 through the at least one portion of the downcomer flow channel 112, temperature of the coolant fluid 122 at one or more locations in the at least one portion of the downcomer flow channel 112, a phase of fluid included in one or more portions of the downcomer flow channel 112, and a location of a fluid two-phase interface (i.e., coolant fluid 122 liquid level) in the downcomer flow channel 112.

Still referring to FIG. 1, in some example embodiments, the separate flowmeter assemblies 132-1 to 132-N of the thermal monitoring array 130 are communicatively coupled to a control system 140 through one or more lines 134. The one or more lines 134 extend between one or more of the flowmeter assemblies 132-1 to 132-N to the control system 140 via one or more penetration nozzles 118 extending through the pressure vessel wall 106. The one or more lines 134 may include one or more power transmission lines configured to supply electrical power to one or more elements of the flowmeter assemblies 132-1 to 132-N. The one or more lines 134 may include one or more communication lines configured send communicate data signals between the control system 140 and at least one of the flowmeter assemblies 132-1 to 132-N. The control system 140 may supply electrical power 142 to one or more elements in the flowmeter assemblies 132 via the one or more lines 134. Temperature data 144 generated by each of the flowmeter assemblies 132-1 to 132-N in the thermal monitoring array 130 may be communicated to the control system 140 via the one or more lines 134.

The control system 140 may process the temperature data 144 generated by the flowmeter assemblies 132-1 to 132-N. Based on the processing, the control system 140 may determine at least one of a flow rate of coolant fluid 122 through at least one portion of the downcomer flow channel 112, a temperature of the coolant fluid 122 in at least one portion of the downcomer flow channel 112, a phase of the coolant fluid 122 in one or more portions in the downcomer flow channel 112, and a location of a fluid two-phase interface (i.e., a coolant fluid 122 liquid level) in the downcomer flow channel 112.

The control system 140 may be implemented using one or more instances of hardware, software, and/or a combination thereof. The control system 140 may include a computer processing device. The control system 140 may include a computer readable storage medium. In some example embodiments, the control system 140 may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), an application-specific integrated circuit (ASIC), an ASIC chip, a programmable logic unit, a microprocessor, or any other device capable of responding to and executing instructions in a defined manner.

Based at least in part upon determining at least one of the coolant fluid 122 flow rate through the downcomer flow channel 112, a temperature of coolant fluid 122 at one or more portions of the downcomer flow channel 112, and a location of a fluid two-phase interface in the downcomer flow channel 112, the control system 140 may control 146 the circulation (i.e., flow rate) of coolant fluid 122, 124 through one or more portions of the nuclear reactor 102.

In some example embodiments, the control system 140 may control the circulation of coolant fluid 122, 124 based on controlling one or more fluid circulation pumps.

In some example embodiments, the control system 140 may control the circulation of coolant fluid 122, based on a relationship between core flow and circulation pump power. Such a relationship may be stored in a lookup table ("LUT"). The LUT may include an array of circulation pump power values and associated core flow rate values. For example, the LUT may include a set of core flow rate values, and the array may associate each separate core flow rate value with a separate circulation pump power value.

The separate circulation pump power values corresponding to each of the separate values of core flow rate in the array may be determined experimentally. For example, a core flow rate of coolant 122, 124 may be measured concurrently with an amount of power supplied to a circulation pump being measured. The concurrently-measured core flow rate value and circulation pump power vale may be entered into the array of the LUT as associated values.

The control system 140 may access the LUT to determine a circulation pump power value that is associated with a determined core flow rate. The control system 140 may control the supply of power to a circulation pump such that an amount of power substantially corresponds to the determined circulation pump power value.

In some example embodiments, the control system 140 may control the circulation of coolant fluid 122, based on a relationship between circulation pump power and a temperature of coolant fluid 122 at one or more portions of the downcomer flow channel 112. Such a relationship may be stored in a lookup table ("LUT"). Such a LUT may be the same LUT that stores a relationship between circulation pump power values and core flow rates.

In some example embodiments, the control system 140 may control the circulation of coolant fluid 122, based on a relationship between circulation pump power and a location of a fluid two-phase interface in the downcomer flow channel 112. Such a relationship may be stored in a lookup table ("LUT"). Such a LUT may be the same LUT that stores a relationship between circulation pump power values and core flow rates.

Still referring to FIG. 1, in some example embodiments, the control system 140 may control 148 one or more portions of the nuclear reactor 102. As a result, the control system 140 may control nuclear reactor 102 performance based on monitoring coolant fluid 122, 124 circulation through the nuclear reactor 102 using the thermal monitoring array 130. The control system 140 may adjust at least one of nuclear reactor core 104 heat rejection (i.e., heat output, power level, etc.) and coolant fluid 122, 124 flow rate to improve nuclear reactor 102 performance.

In some example embodiments, the control system 140 is configured to control the flow rate of coolant fluid 122 through separate nozzles 116 to control at least one of coolant fluid 122 flow rates through one or more downcomer flow channel 112 portions, coolant fluid 122 temperatures in one or more downcomer flow channel 112 portions, etc. Such control may be based on a temperature of the coolant fluid 122 in one or more portions of the downcomer flow channel 112. Such control may be implemented to improve uniformity of temperature distribution of the coolant fluid through the downcomer flow channel 112. As a result, nuclear reactor 102 operations at a nuclear power plant 100 may be improved due to improved uniformity of nuclear reactor 102 performance resulting from improved uniformity of coolant fluid 122 temperature.

Figure 2:
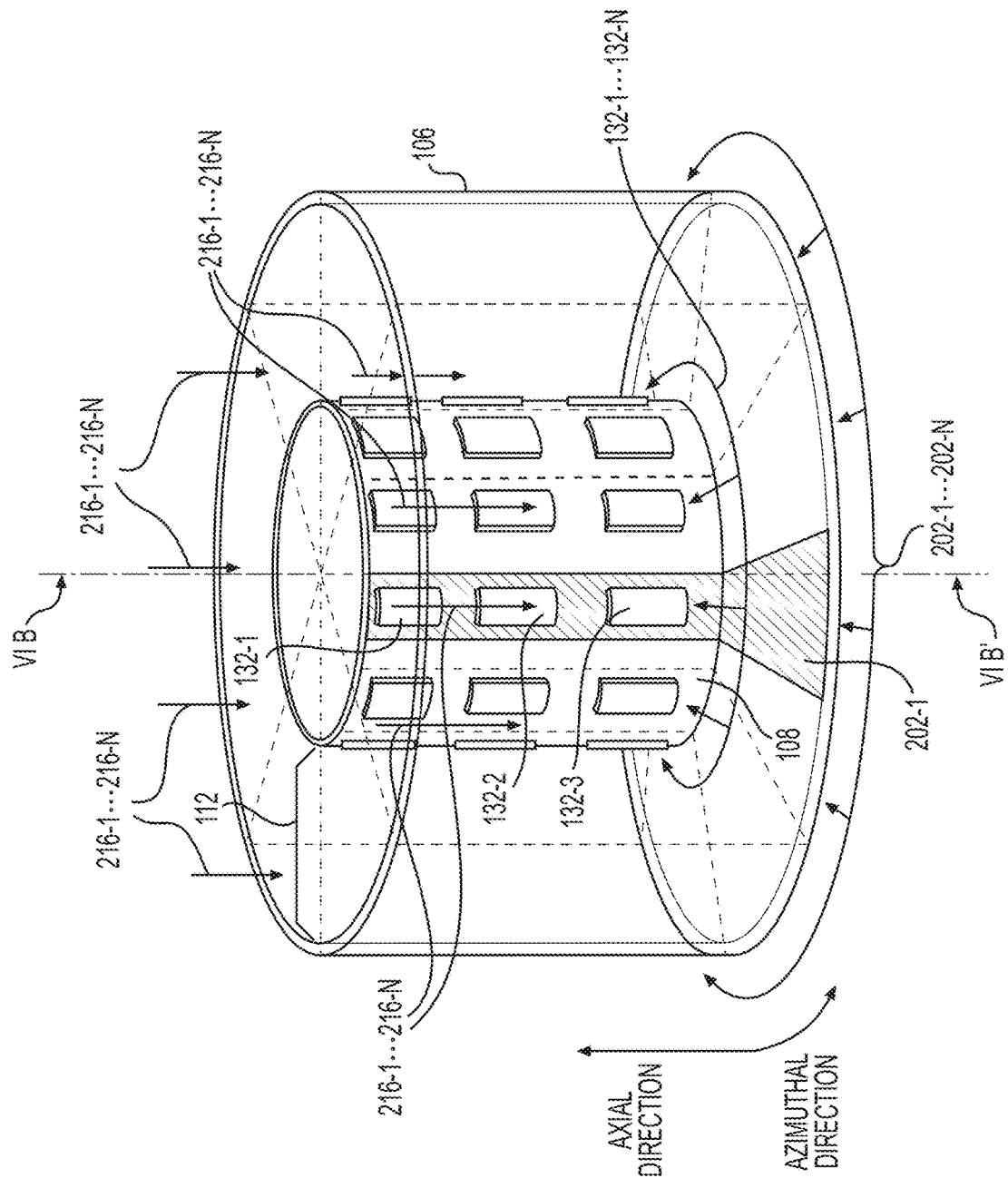
FIG. 2 is a perspective view of a nuclear reactor that includes a thermal monitoring array, according to some example embodiments.
Figure 3:
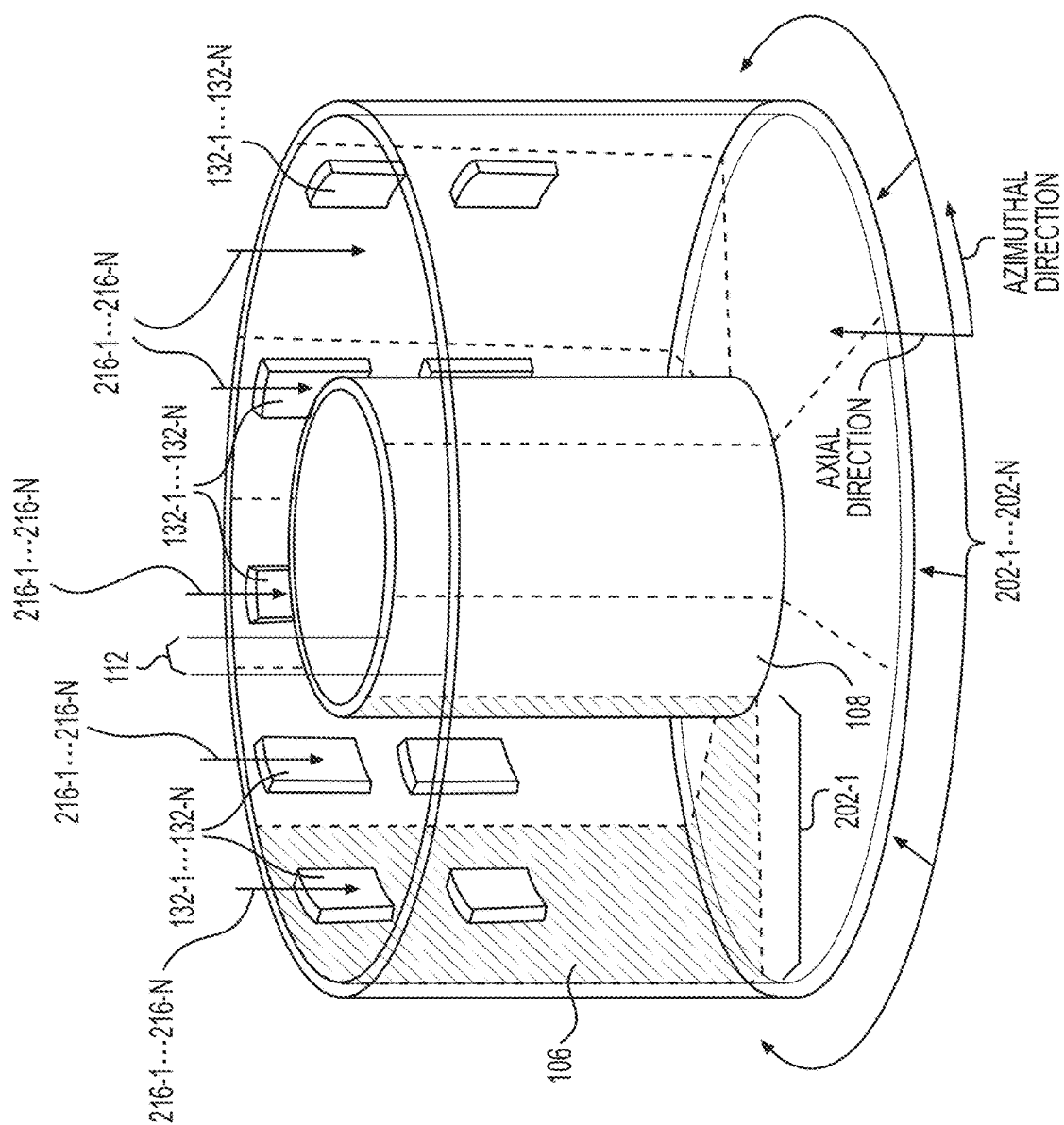
FIG. 3 is a perspective view of a nuclear reactor that includes a thermal monitoring array, according to some example embodiments.

FIG. 2 is a perspective view of a nuclear reactor that includes a thermal monitoring array, according to some example embodiments. FIG. 3 is a perspective view of a nuclear reactor that includes a thermal monitoring array, according to some example embodiments. The nuclear reactors 102 shown in FIG. 2 and FIG. 3 may be included in any embodiment of nuclear reactors included herein, including the nuclear reactor 102 shown in FIG. 1.

Referring to FIG. 2 and FIG. 3, a downcomer flow channel 112 may include separate flow channel portions 202-1 to 202-N. Separate flow channel portions 202-1 to 202-N may be at least one of axially separated and azimuthally separated. As shown in FIG. 2 and FIG. 3, for example, a downcomer flow channel 112 may include a set of equally axially-sized flow channel portions 202-1 to 202-N, where each of the flow channel portions 202-1 to 202-N encompass azimuthally-separate portions of the downcomer flow channel 112.

In some example embodiments, each separate one of the portions 202-1 to 202-N may be at least partially defined by a portion of the downcomer assembly 110 included in the nuclear reactor 102, as shown in FIG. 1. As shown in FIG. 2 and FIG. 3, for example, each downcomer flow channel portion 202-1 to 202-N is at least partially defined by azimuthally-separate portions of the core shroud 108 and the pressure vessel wall 106. In FIG. 2 and FIG. 3, the portions of a downcomer assembly 110 defining an individual downcomer flow channel portion 202-1 are highlighted.

In some example embodiments, a thermal monitoring array 130 includes a set of flowmeter assemblies 132-1 to 132-N exposed to separate portions 202-1 to 202-N of the downcomer flow channel 112. A limited and separate selection of the flowmeter assemblies 132-1 to 132-N of a thermal monitoring array 130 may be exposed to a given individual flow channel portion 202-1 to 202-N of the downcomer flow channel 112. As shown in FIG. 2, for example, a limited selection of three (3) flowmeter assemblies 132-1, 132-2, 132-3 are coupled to a portion of the core shroud 108 that defines a particular flow channel portion 202-1 such that the limited selection of flowmeter assemblies 132-1, 132-2, 132-3 are exposed to the particular flow channel portion 202-1 and a remainder of flowmeter assemblies 132-1 to 132-N included in the thermal monitoring array 130 are exposed to a remainder of the flow channel portions 202-1 to 202-N of the downcomer flow channel 112. In some example embodiments, each of the flowmeter assemblies 132-1 to 132-N of a thermal monitoring array 130 is coupled to separate portions of the downcomer assembly 110 such that each of the flowmeter assemblies 132-1 to 132-N is exposed to a separate portion 202-1 to 202-N of the downcomer flow channel 112.

Still referring to FIG. 2 and FIG. 3, in some example embodiments, a set of flowmeter assemblies 132-1 to 132-N exposed to a given flow channel portion 202-1 to 202-N may be located at separate locations on a surface defining the downcomer flow channel portion 202-1 to 202-N, where the separate locations are at least one of axially-separate locations and azimuthally separate locations. For example, flowmeter assemblies 132-1, 132-2, 132-3 that are exposed to the flow channel portion 202-1 illustrated in FIG. 2 are coupled to azimuthally-common, axially-separate locations on the outer surface of the core shroud 108. As a result, each of the flowmeter assemblies 132-1, 132-2, 132-3 is configured to generate temperature data based on monitoring one or more coolant fluid flowstreams through axially-separate portions of the portion 202-1 of the downcomer flow channel 112.

In some example embodiments, each set of flowmeter assemblies 132-1 to 132-N exposed to separate portions 202-1 to 202-N of the downcomer flow channel 112 is configured to generate temperature data that may be processed to determine separate flow rates 216-1 to 216-N of coolant fluid 122 through the respective flow channel portion 202. Temperature data generated by separate sets of flowmeter assemblies 132-1 to 132-N of the thermal monitoring array 130 may be processed to determine separate flow rates 216-1 to 216-N of coolant fluid 122 through each of the separate flow channel portions 202 of the downcomer flow channel 112. The total flow rate of coolant fluid 122 through the downcomer flow channel 112 may be determined based on a sum of the individual flow rates 216-1 to 216-N of coolant fluid 122 through the separate flow channel portions 202-1 to 202-N. The total flow rate may equal the core flow of coolant fluid 122 through the core flow channel 114 of the nuclear reactor 102 illustrated in FIG. 1.

In some example embodiments, at least one of flowmeter assemblies 132-1 to 132-N may be coupled to one or more surfaces of the downcomer assembly 110. In the illustrated embodiment shown in FIG. 2, for example, the flowmeter assemblies 132-1 to 132-N are coupled to separate portions of an outer surface of the core shroud 108. In the illustrated embodiment shown in FIG. 3, for example, the flowmeter assemblies 132-1 to 132-N are coupled to separate portions of an inner surface of the pressure vessel wall 106.

Figure 4:
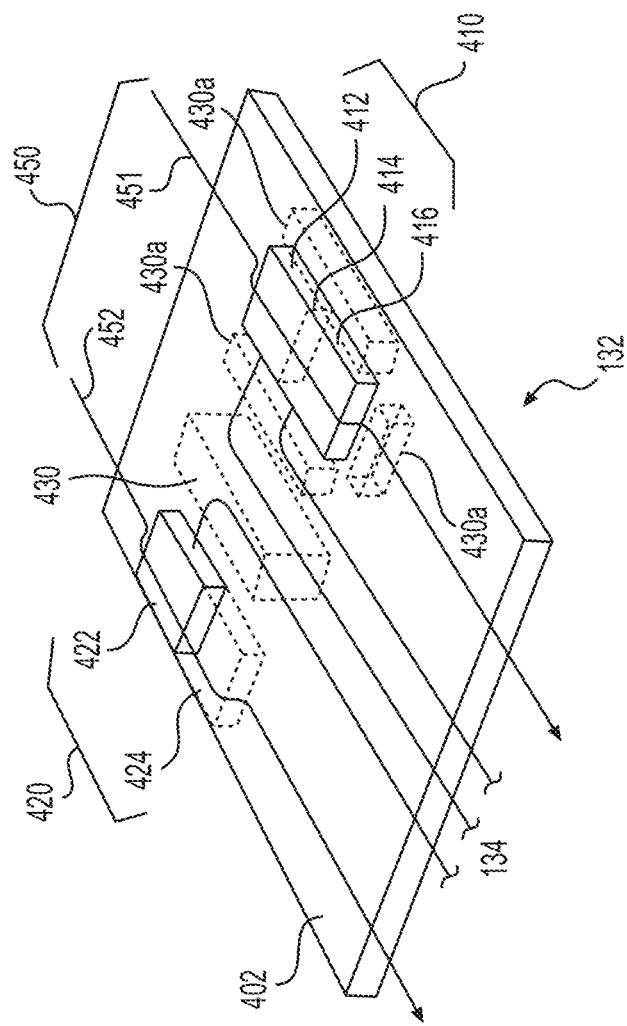
FIG. 4 is a perspective view of a flowmeter assembly, according to some example embodiments.

FIG. 4 is a perspective view of a flowmeter assembly, according to some example embodiments. The flowmeter assembly 132 shown in FIG. 4 may be included in any of the embodiments of flowmeter assemblies 132-1 to 132-N included herein.

Flowmeter assembly 132 includes at least one first sensor assembly 410 and at least one second sensor assembly 420.

The first and second sensor assemblies 410 and 420 are coupled to a backplane 402. In some example embodiments, the backplane 402 is a surface of a portion of the downcomer assembly 110, such that the first and second sensor assemblies 410 and 420 are coupled directly to a surface of a portion of the downcomer assembly 110.

The first sensor assembly 410 includes a first temperature sensor 412 and a heating element 416 coupled to an interface 414 of the first temperature sensor 412. The interface 414 has a surface area "A". The first temperature sensor 412 is configured to be exposed to a first flowstream 451 of coolant fluid. Thus, the first temperature sensor 412 is configured to measure a temperature of the first flowstream 451 of coolant fluid and generate first temperature data based on the temperature of the first flowstream 451 of coolant fluid.

The heating element 416 is configured to transmit heat to the first temperature sensor 412 through the surface area "A" of the interface 414 between the heating element 416 and the first temperature sensor 412. As shown, the heating element 416 and the first temperature sensor 412 are configured to be electrically coupled to a control system via a set of lines 134.

The second sensor assembly 420 includes a second temperature sensor 422. The second temperature sensor 422 is configured to be exposed to a second flowstream 452 of coolant fluid. Thus, the second temperature sensor 422 is configured to measure a temperature of the second flowstream 452 of coolant fluid and generate second temperature data based on the temperature of the second flowstream 452 of coolant fluid.

In some example embodiments, the second sensor assembly 420 includes a dummy heating element 424. The dummy heating element 424 may configure the second sensor assembly 420 to have a similar mass and thermal environment as the first sensor assembly 410 that includes heating element 416. In addition, the presence of the dummy heating element 424 may enable the flowstreams 451 and 452 to follow similar flow paths over the respective first and second sensor assemblies 410 and 420. As a result, the dummy heating element 424 may configure the flowmeter assembly 132 to generate temperature data with greater precision, as the first and second temperature sensors 412, 422 may generate temperature data based on measuring temperatures of respective first and second flowstreams 451, 452 under similar flow and thermal conditions.

In some example embodiments, the dummy heating element 424 is absent from the flowmeter assembly 132. The absence of the dummy heating element 424 may simplify the flowmeter assembly 132 and fabrication thereof. In some example embodiments, the effects of the absence of the dummy heating element 424 may be compensated through calibration of the flowmeter assembly 132. As shown, the second temperature sensor 422 is configured to be electrically coupled to a control system via a set of lines 134.

In some example embodiments, the second temperature sensor 422 is at least partially insulated from the heating element 416. For example, the flowstream assembly 132 may include insulating material 430/430a, also referred to herein as "insulation," that is configured to at least partially insulate the second temperature sensor 422 from the heating element 416. In some example embodiments, the insulating material 430/430a is included in the backplane 402. In some example embodiments, the insulating material 430/430a is absent and the second temperature sensor 422 is at least partially insulated from the heating element 416 based on a spacing of the second temperature sensor 422 from the heating element 416 such that coolant fluid flowing between the first and second sensor assemblies 410 and 420 at least partially insulates the second temperature sensor 422 from the heating element 416. In some example embodiments, the insulating material 430/430a includes a packed insulation material. In some example embodiments, the insulating material 430/430a includes a ceramic powder. The insulating material 430a may be packed around the heating element 416 and at least a portion of the first temperature sensor 412. In some example embodiments, one or more of the lines 400 may include a radiation-hardened wire or cable. For example, one or more of the lines 134 may include a HABIA® cable.

In some example embodiments, one or more of the first and second temperature sensors 412 and 422 is at least one of a Resistance Temperature Detector (RTD) and a Thermocouple (TC) temperature sensor. The heating element 416 may be an electrical heating element.

Still referring to FIG. 4, in some example embodiments, the first temperature sensor 412 is configured to measure a first temperature $T_1$ based on measuring a temperature of the first flowstream 451 and further based on being heated by heating element 416 through the surface area A of interface 414. The second temperature sensor 422 may be configured to measure a second temperature $T_2$ based on measuring a temperature of the second flowstream 452. When the second temperature sensor 422 is insulated from the heating element 416, the measured temperature $T_2$ may be independent of any heat generated by the heating element 416. The first and second temperature sensors 412 and 422 may generate respective first and second temperature data, where the first temperature data includes data indicating the measured first temperature $T_1$ and the second temperature data includes data indicating the measured second temperature $T_2$.

In some example embodiments, a control system 140 (illustrated and discussed with reference to FIG. 1) may process the temperature data generated by the first and second temperature sensors 412 and 422 to determine a combined flowrate of the first and second flowstreams 451 and 452. In some example embodiments, the first and second flowstreams 451 and 452 may be assumed to have a common temperature upstream of the respective first and second sensor assemblies 410 and 420. When the second temperature sensor 422 is at least partially insulated from heating element 416, a difference between the measured $T_1$ and $T_2$ may be determined as a temperature difference based on the heat generated by heating element 416 that is transmitted to the first temperature sensor 412 through the surface area A of interface 414.

Still referring to FIG. 4, in some example embodiments, the magnitude of a rate of heat transfer from the heating element 416 to the first temperature sensor 412 through interface 414 may be determined based on the magnitude of electrical power "P" supplied to the heating element 416. The magnitude of the rate of heat transfer may be referred to herein as "$Q_H$" and the magnitude of the heating element-generated heat flux may be "$Q_H/A$" where "A" is the surface area of the interface 414. In some example embodiments, $Q_H$ is proportional to the magnitude of electrical power P according to a proportional relationship. Thus, in some example embodiments, $Q_H$ may be determined based on a determination of "P."

In some example embodiments, where the temperature of the coolant fluid in the downcomer flow channel is "$T_{env}$" and the local surface heat flux resulting from the coolant fluid is "$Q_L$", and an equivalent heat transfer coefficient is "$U_{eq}$," the local surface heat flux at the second temperature sensor 422 may be expressed as shown in equation (1) below:

$$Q_L = U_{eq}(T_2 - T_{env}) \tag{1}$$

When the surface area A of interface 414 is determined and the rate of heat transfer $Q_H$ is determined based on the magnitude of electrical power P supplied to the heating element 416, the local surface heat flux at the first temperature sensor 412 may be the sum of the local surface heat flow resulting from the first flowstream 451 of coolant fluid and the local surface heat flux resulting from the heating element 416. Such a local surface heat flux at the first temperature sensor 412 may be expressed as shown in equation (2) below:

$$Q_L + (Q_H/A) = U_{eq}(T_1 - T_{env}) \tag{2}$$

To eliminate $Q_L$ and correlate the flow rate or equivalent heat transfer coefficient $U_{eq}$ to the temperature difference between the first and second temperature sensors 412 and 422, equation (1) may be subtracted from equation (2) to arrive at equation (3) shown below:

$$(Q_H/A) = U_{eq}(T_1 - T_2) \tag{3}$$

As shown in equation (3), the equivalent heat transfer coefficient $U_{eq}$ may be inversely proportional to the temperature difference $(T_1-T_2)$ between the first and second temperature sensors 412 and 422. For example, where the magnitude of electrical power "P" is held substantially constant, the heat flux "$(Q_H/A)$" may remain constant.

Still referring to FIG. 4, in some example embodiments, the equivalent heat transfer coefficient $U_{eq}$ is related to a flow rate 450 of the combined first and second flowstreams 451 and 452 according to a relationship. For example, the equivalent heat transfer coefficient $U_{eq}$ may be proportional to the flow rate 450 of the combined first and second flowstreams 451 and 452 of coolant fluid.

Thus, in some example embodiments, the equivalent heat transfer coefficient $U_{eq}$ may be determined based on the temperature data indicating measured temperatures $T_1$ and $T_2$ when the surface area A is determined and the heat transfer rate $Q_H$ is determined based on a determined magnitude of electrical power P supplied to the heating element 416. In some example embodiments, the flow rate 450 of the combined first and second flowstreams 451 and 452 may be determined based on a relationship between the equivalent heat transfer coefficient $U_{eq}$ and the flow rate 450.

In some example embodiments, the relationship between a flow rate ("M") 450 and the temperature difference $\Delta T$ between $T_1$ and $T_2$ (where $\Delta T$ is $T_1-T_2$) may be expressed by equation (4), shown below, where $A_1$, $A_2$, $A_3$, and $A_4$ are constants:

$$M = A_1 + A_2(\Delta T) + A_3(\Delta T^2) + A_4(\Delta T^3) \tag{4}$$

The values of $A_1$, $A_2$, $A_3$, and $A_4$ may be determined experimentally. For example, a temperature difference $\Delta T$ between $T_1$ and $T_2$ measured by the first and second temperature sensors 412 and 422 in a flowmeter assembly 132 may be measured concurrently with the flow rate M of coolant fluid circulating in flow communication with the flowmeter assembly 132 being measured. The flow rate may be measured by a flowmeter device. The temperature difference $\Delta T$ may be measured concurrently with the flow rate M being varied across a range of flow rate values, such that a set of flow rate values M and corresponding $\Delta T$ values are determined. The flow rate values M and corresponding $\Delta T$ values may be fit to equation (4) to solve for the values of the constants $A_1$, $A_2$, $A_3$, and $A_4$.

In some example embodiments, the experimentally, concurrently-measured flow rate values M and corresponding $\Delta T$ values may be stored as associated values in an array of a lookup table ("LUT"). Each $\Delta T$ value in the array may be associated with a separate corresponding value of the flow rate 450. To determine a flow rate M 450 based on a determined value of $\Delta T$ $(T_1-T_2)$, a control system 140 may access the LUT and identify a value of the flow rate M 450 that is associated with the determined value of $\Delta T$ in the array.

Still referring to FIG. 4, in some example embodiments, the combined flow rate 450 of the first and second flowstreams 451 and 452 may be at least one of the flow rates 216-1 to 216-N of coolant fluid 122 through at least one of the portions 202-1 to 202-N of the downcomer flow channel 112 to which the flowmeter assembly 132 is exposed. Thus, the flow rate 450 of the combined flowstreams 451 and 452 may be at least one of the flow rates 216-1 to 216-N of coolant fluid through at least one portion 202-1 to 202-N of the downcomer flow channel 112 to which the flowmeter assembly 132 is exposed, as illustrated and described above with reference to FIG. 2 and FIG. 3.

The above determinations may be implemented by a control system 140 electrically coupled to the heating element 416 and first and second temperature sensors 412 and 422 through lines 400, as illustrated and discussed above with reference to FIG. 1. The control system 140 may store information indicating the surface area A, one or more relationships between electrical power P and heat transfer rate $Q_H$, and one or more relationships between the equivalent heat transfer coefficient $U_{eq}$ and the flow rate 450.

The control system 140 illustrated in FIG. 1 may determine the magnitude of electrical power P supplied to the heating element 416 via one or more lines 134. The control system 140 may determine $Q_H$ based on the one or more relationships between electrical power P and heat transfer rate $Q_H$. The control system 140 may receive respective first and second temperature data from the first and second temperature sensors 412 and 422 of a flowmeter assembly 132. The control system 140 may determine the equivalent heat transfer coefficient $U_{eq}$ based on equation (3). The control system 140 may determine the flow rate 450 based on one or more relationships between the equivalent heat transfer coefficient $U_{eq}$ and the flow rate 450.

Where the control system 140 receives temperature data and electrical power data associated with separate sets of flowstream assemblies 132-1 to 132-N in the thermal monitoring array 130, the control system 140 may determine the separate flow rates 450 of coolant fluid to which the separate flowstream assemblies 132-1 to 132-N are exposed. The separate flow rates 450 may be the separate flow rates 216-1 to 216-N illustrated and discussed with reference to FIG. 2 and FIG. 3. The separate flow rates 216-1 to 216-N may thus be determined based at least in part on temperature data received from each of the sets flowmeter assemblies 132-1 to 132-N exposed to the respective separate portions 202-1 to 202-N of the downcomer flow channel 112.

The control system 140 may determine a total flow rate of coolant fluid 122 through the downcomer flow channel 112 based on a sum of at least some of the separate flow rates 450 as a sum of the flow rates 216-1 to 216-N. When the total flow rate of coolant fluid 122 through the downcomer flow channel 112 equals the core flow rate of coolant fluid 122, 124 through the cow flow channel 114 illustrated and described with reference to FIG. 1, the control system 140 may determine the core flow through the nuclear reactor 102 illustrated in FIG. 1 based on the determined total flow rate.

Referring back to FIG. 1, FIG. 2 and FIG. 3, in some example embodiments, the control system 140 may compare separate mass flow rates 216-1 to 216-N determined for each of the portions of the downcomer flow channel 112 to monitor for anomalous flow conditions in the downcomer flow channel 112. For example, the control system 140 may compare flow rates 216-1 to 216-N determined for separate azimuthally-separate portions 202-1 to 202-N of the downcomer flow channel 112. The control system 140 may determine asymmetric coolant fluid 122 flow through the azimuthally-separate portions 202-1 to 202-N of the downcomer flow channel 112 based on such monitoring. In some example embodiments, the control system 140 may control coolant fluid 122 flow through one or more portions 202-1 to 202-N of the downcomer flow channel 112 based on such monitoring. For example, the control system 140 may control one or more circulation pumps included in the coolant fluid circulation loop 120, etc. to control coolant fluid 122 flow rates 216-1 to 216-N through separate portions 202-1 to 202-N of the downcomer flow channel 112 to maintain uniform and/or substantially uniform coolant fluid 122 flow through the separate portions 202-1 to 202-N of the downcomer flow channel 112. The control system 140 may control one or more circulation pumps according to a lookup table that associates circulation pump power values with flow rate values, as described above.

In some example embodiments, asymmetric coolant fluid 122 flow through separate portions 202-1 to 202-N of the downcomer flow channel 112 may result in asymmetric heat rejection by different portions of the nuclear reactor core 104. Controlling a coolant fluid 122 flow rate through separate portions 202-1 to 202-N of the downcomer flow channel 112 based on monitoring the separate flow rates 216-1 to 216-N of coolant fluid 122 through separate portions 202-1 to 202-N of the downcomer flow channel 112 may reduce such asymmetry, thereby improving nuclear reactor operations.

Still referring to FIG. 4, the first and second temperature sensors 412 and 422 are configured to measure temperatures of separate, parallel flowstreams 451 and 452 such that the second temperature sensor 422 is restricted from measuring a temperature of the first flowstream 451 and the first temperature sensor 412 is restricted from measuring a temperature of the second flowstream 452.

In some example embodiments, the first and second temperature sensors 412, 422 are configured to measure temperatures of a common flowstream, such that the first and second flowstreams 451 and 452 are a common flowstream. The second sensor assembly 420 may be positioned at an upper position in the downcomer assembly 110, relative to the first sensor assembly 410, such that the second temperature sensor 422 is configured to measure a temperature of the common flowstream upstream of the first temperature sensor 412. As a result, the second temperature sensor 422 may be at least partially insulated from any heating of the common flowstream by the heating element 416.

Figure 5:
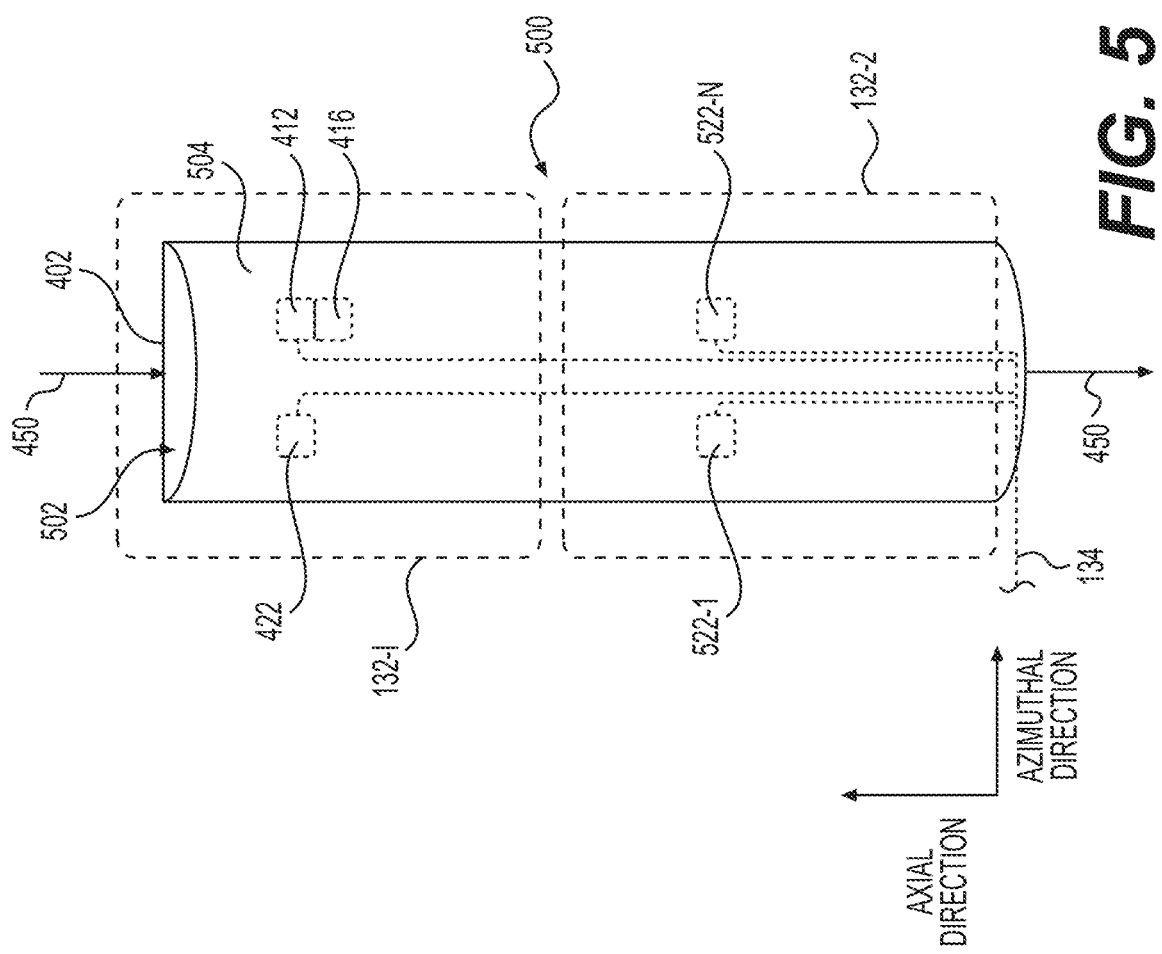
FIG. 5 is a perspective view of a flowmeter assembly, according to some example embodiments.

FIG. 5 is a perspective view of a flowmeter assembly, according to some example embodiments. The flowmeter assembly 500 shown in FIG. 5 may be included in any of the embodiments of flowmeter assemblies 132-1 to 132-N included herein.

In some example embodiments, a flowmeter assembly includes at least one first temperature sensor to which a heating element is coupled and multiple temperature sensors that are at least partially insulated from the heating element. As shown in FIG. 5, for example, a flowmeter assembly 500 includes, in addition to the first temperature sensor 412, heating element 416, and second temperature sensor 422, at least one third temperature sensor 522-1 to 522-N, where N is a positive integer. In some example embodiments, N may have a value of one (1) such that third temperature sensor 522-N is absent from the flowmeter assembly 500. Each of the third temperature sensors 522-1 to 522-N may be at least partially insulated from the heating element 416. One or more of the third temperature sensors 522-1 to 522-N may be coupled to a dummy heating element (not shown in FIG. 5).

In some example embodiments, each of the second and third temperature sensors 422 and 522-1 to 522-N may generate separate instances of temperature data indicating respective second temperatures $T_2$ measured by the respective second and third temperature sensors 422 and 522-1 to 522-N. It will be understood that each of the third temperature sensors 522-1 to 522-N may measure separate second temperatures $T_2$, as the third temperature sensors 522-1 to 522-N are each at least partially insulated from the heating element 416, similarly to the second temperature sensor 422. As a result, both the second temperature sensor 422 and the third temperature sensors 522-1 to 522-N may measure temperatures of coolant flowstreams independently of being heated by the heating element 416.

Each of the third temperature sensors 522-1 to 522-N may be electrically coupled to a control system via one or more lines 134. The temperature data generated by the first, second, and third temperature sensors 412, 422, 522-1 to 522-N may be communicated to a control system 140 via the lines 134, where the control system 140 is illustrated and described above with reference to FIG. 1. The control system 140 may process the instances of second temperature data received from the second temperature sensor 422 and third temperature sensors 522-1 to 522-N. Such processing may include determining a second temperature $T_2$ based on the temperatures measured by the second and third temperature sensors 422 and 522-1 to 522-N. For example, the control system 140 may determine a second temperature $T_2$ that is an average of the temperatures measured by the second and third temperature sensors 422 and 522-1 to 522-N.

Still referring to FIG. 5, in some example embodiments the second and third temperature sensors 422 and 522-1 to 522-N may be coupled to separate relative portions of a downcomer assembly so that the second and third temperature sensors 422 and 522-1 to 522-N are each exposed to separate portions of a downcomer flow channel. For example, second temperature sensor 422 is positioned at a separate axial location relative to third temperature sensors 522-1 to 522-N. In another example, second and third temperature sensors 422 and 522-1 are positioned at a separate azimuthal location relative to temperature sensor 522-N. As a result, temperature data generated by the second and third temperature sensors 422 and 522-1 to 522-N may be processed to determine a temperature $T_2$ that more accurately reflects a local surface heat flux $Q_L$ than an individual temperature measurement $T_2$ by an individual second temperature sensor of the temperature sensors 422 and 522-1 to 522-N.

In some example embodiments, a thermal monitoring array 130 includes multiple flowmeter assemblies, where a first temperature sensor 412 and coupled heating element 416 is absent from at least one flowmeter assembly 500 included in the thermal monitoring array 130. In FIG. 5, for example, where the thermal monitoring array 130 includes flowmeter assemblies 132-1 to 132-N, first and second temperature sensors 412 and 422 may be included in a first flowmeter assembly 132-1 of the thermal monitoring array 130 and second temperature sensors 522-1 to 522-N may be included in a separate flowmeter assembly 132-2 of the thermal monitoring array 130. As shown, the separate flowmeter assemblies 132-1 to 132-2 may be located at separate locations on the downcomer assembly 110 including different azimuthal locations and different axial locations. The second flowmeter assembly 132-2 may exclude a first temperature sensor 412 and coupled heating element 416.

In some example embodiments, a temperature of coolant fluid 122 flowing through the downcomer flow channel 112 may be relatively uniform at different azimuthal locations throughout a given axial portion of the downcomer flow channel 112. As a result, a first temperature sensor 412 and coupled heating element 416 may be absent from the second flowmeter assembly 132-2 when the first and second flowmeter assemblies 132-1 and 132-2 are exposed to substantially similar axial portions of the downcomer flow channel 112. Temperature data generated by the first temperature sensor 412 in the first flowmeter assembly 132-2 may be used with temperature data generated by the second temperature sensors 522-1 to 522-2 in the second flowmeter assembly 132-2 to determine a flow rate 450 of coolant fluid at the second flowmeter assembly 132-2.

In some example embodiments, a flowmeter assembly 132 includes multiple first temperature sensors 412. The flowmeter assembly 500 may include multiple heating elements 416, and each separate heating element 416 may be directly coupled to a separate first temperature sensor 412. The multiple first temperature sensors 412 may be positioned at separate relative locations.

Still referring to FIG. 5, in some example embodiments, each of the first temperature sensors 412 may generate separate temperature data indicating respective first temperatures $T_1$ measured by the respective first temperature sensors 412. Each of the first temperature sensors 412 may be electrically coupled to a control system 140 via one or more lines 134. The temperature data generated by the multiple first temperature sensors 412 may be communicated to a control system via the lines 134. The control system 140 may process the first temperature data received from the first temperature sensors 412. Such processing may include determining a first temperature $T_1$ based on the first temperatures $T_1$ measured by the first temperature sensors 412. For example, the control system may determine a first temperature $T_1$ that is an average of the first temperatures $T_1$ measured by the first temperature sensors 412.

Still referring to FIG. 5, in some example embodiments, the flowmeter assembly 500 includes a channel cover 504 that extends over the backplane 402. The channel cover 504 may at least partially define a flow channel 502 to which the temperature sensors 412, 422, 522-1 to 522-N of the flowmeter assembly 500 are exposed. The channel cover 504 may isolate the temperature sensors 412, 422, 522-1 to 522-N of the flowmeter assembly 500 from a remainder portion of the downcomer flow channel 112, such that temperature data generated by the temperature sensors 412, 422, 522-1 to 522-N is at least partially independent of interference from other elements of the nuclear reactor 102, coolant fluid 122 flowing through one or more portions 202-1 to 202-N of the downcomer flow channel 112, heat generated by heating elements 416 included in other flowmeter assemblies 132-1 to 132-N, etc.

Figure 6:
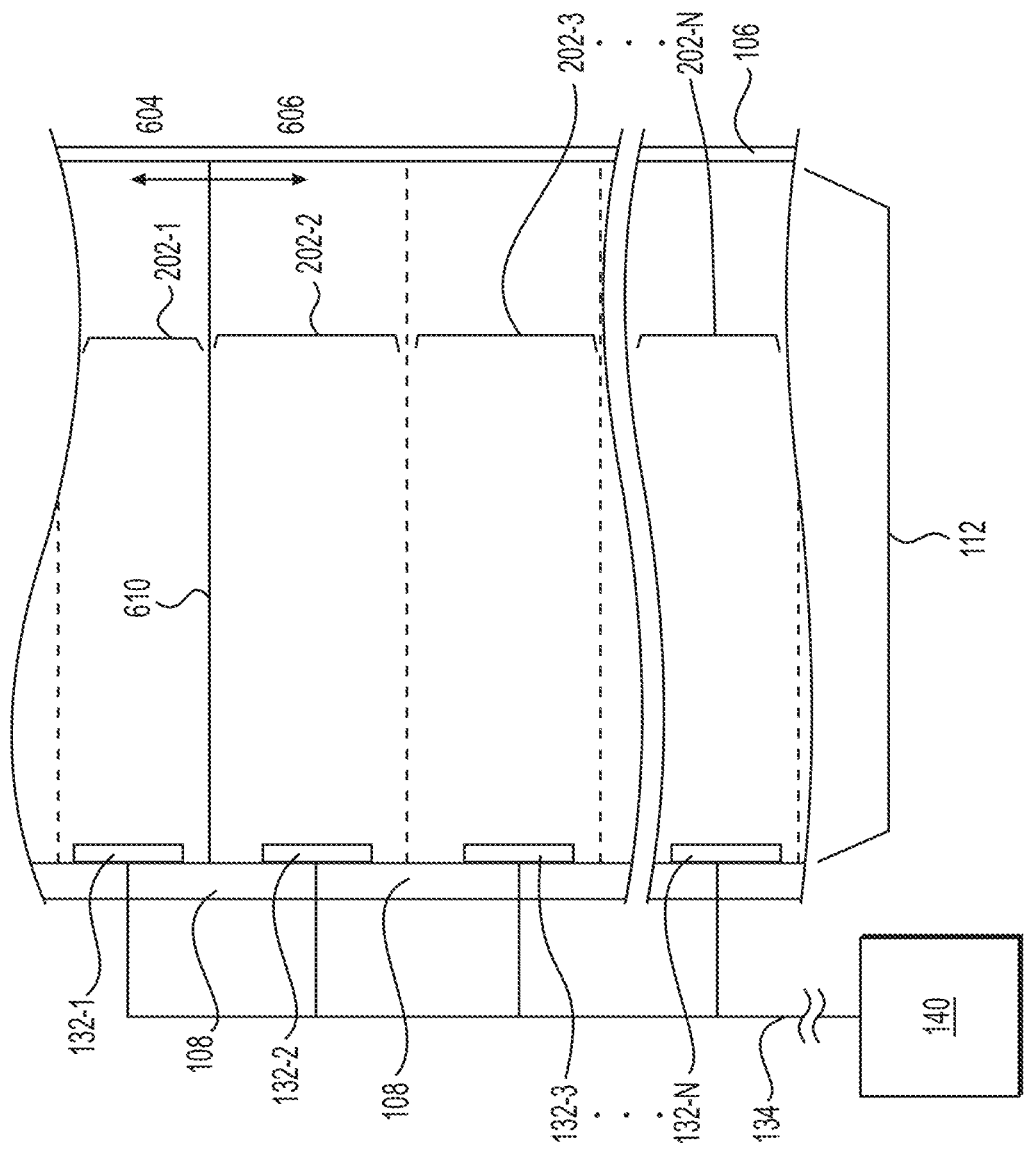
FIG. 6 illustrates a schematic view of the downcomer flow channel of FIG. 2 along line VIB-VIB', according to some example embodiments.

FIG. 6 illustrates a schematic view of the downcomer flow channel 112 of FIG. 2 along line VIB-VIB', according to some example embodiments.

The downcomer flow channel 112 portion shown in FIG. 6 includes portions of the core shroud 108 and the vessel wall 106, with flowmeter assemblies 132-1 to 132-N coupled to a surface of the core shroud 108. It will be appreciated that, in some example embodiments, one or more of the flowmeter assemblies 132-1 to 132-N may be coupled to the vessel wall 106.

Each of the flowmeter assemblies 132-1 to 132-N shown in FIG. 6 is coupled to the core shroud 108 at different axial locations (i.e. different levels) such that each of the flowmeter assemblies 132-1 to 132-N is exposed to axially-separate portions 202-1 to 202-N of the downcomer flow channel 112. It will be appreciated that, in some example embodiments, one or more of the flowmeter assemblies 132-1 to 132-N may be coupled to one or more of the core shroud 108 and the vessel wall 106 at different azimuthal locations such that the one or more flowmeter assemblies 132-1 to 132-N are exposed to azimuthally-separate portions 202-1 to 202-N of the downcomer flow channel 112.

In some example embodiments, the downcomer flow channel 112 includes at least two phases 604, 606 of fluids. For example, one or more liquids may fill a portion of the downcomer flow channel 112 and one or more gases may fill a remainder portion of the downcomer flow channel 112. The one or more liquids may include a liquid phase of the coolant fluid 122, one or more other liquids, etc. The one or more gasses may include a gas phase of the coolant fluid 122, one or more other gases, etc.

In some example embodiments, one or more lower portions of the downcomer flow channel 112 are filled by one or more liquid fluids and one or more upper portions of the downcomer flow channel are filled by one or more gaseous fluids, such that a fluid two-phase interface between the gaseous fluids and the liquid fluids is located within the downcomer flow channel 112. In the example embodiment illustrated in FIG. 6, for example, the downcomer flow channel 112 may be filled with at least one gaseous fluid 604 and at least one liquid fluid 606. A fluid two-phase interface 610 may be located in the downcomer flow channel 112 between the at least one gaseous fluid 604 and at least one liquid fluid 606. As noted above, the at least one liquid fluid 606 may include the coolant fluid 122 described above with reference to FIG. 1 in a liquid phase. In addition, the at least one gaseous fluid 604 may include at least one of a gaseous phase of the coolant fluid 122 and one or more additional fluids in a gaseous phase.

In some example embodiments, a control system 140 that receives temperature data generated by the flowmeter assemblies 132-1 to 132-N may process the temperature data to determine a phase of fluid to which each of the flowmeter assemblies 132-1 to 132-N is exposed. The control system 140 may include a storage device that stores temperature threshold values, ranges, etc. associated with separate phases of fluids to which a given flowmeter assembly may be exposed. Based on temperature data received from each of the flowmeter assemblies 132-1 to 132-N, the control system 140 may compare temperatures measured by at least one temperature sensor of each of the flowmeter assemblies 132-1 to 132-N to one or more threshold values, ranges, etc. to determine a phase of fluid in each of the separate, respective portions 202-1 to 202-N to which the flowmeter assemblies 132-1 to 132-N are respectively exposed.

In some example embodiments, the control system 140 may determine a location of a fluid two-phase interface 610 (e.g., coolant fluid liquid level) in the downcomer flow channel 112 based on determining that adjacent flowmeter assemblies 132-1 to 132-N are exposed to different phases of fluid. In the example embodiment illustrated in FIG. 6, for example, the flowmeter assembly 132-1 is exposed to a gaseous fluid 604, and the flowmeter assemblies 132-2 to 132-N are exposed to a liquid phase fluid 606.

The control system 140 may determine, based on processing temperature data generated by the flowmeter assemblies 132-1 to 132-N, that each of the flowmeter assemblies 132-2 to 132-N are exposed to respective portions 202-2 to 202-N of the downcomer flow channel 112 that are filled with liquid phase fluid 606. The control system 140 may further determine that flowmeter assembly 132-1 is exposed to a portion 202-1 of the downcomer flow channel 112 that is filled with gaseous fluid 604. The control system 140 may maintain a database that associates each respective flowmeter assembly 132-1 to 132-N with a separate particular location within the nuclear reactor 102. The control system 140 may determine that flowmeter assemblies 132-1 and 132-N axially-adjacently located in the nuclear reactor based on accessing the database. The control system 140 may determine that the axially-adjacent flowmeter assemblies 132-1 and 132-2 are exposed to adjacent portions 202-1 and 202-2 of the downcomer flow channel 112 that are filled with different phases of fluid. Based on the determination, the control system 140 may determine that a fluid two-phase interface 610 is located between the flowmeter assemblies 132-1 and 132-2. Because the control system 140 may access the database that indicates the locations of the flowmeter assemblies 132-1 and 132-2 in the nuclear reactor 102, the control system 140 may determine a location of the fluid two-phase interface 610 (i.e., coolant fluid 122 liquid level) in the downcomer flow channel 112 based on the determination that the fluid two-phase interface 610 is located between the flowmeter assemblies 132-1 and 132-2.

In some example embodiments, the control system 140 may determine that a fluid two-phase interface 610 is located between at least two adjacent axially-separated flowmeter assemblies 132-1 to 132-N based on comparing temperature data generated by the at least two adjacent axially-separated flowmeter assemblies 132-1 to 132-N. For example, the control system 140 may compare temperature data generated by the adjacent flowmeter assemblies 132-2 and 132-3. The control system 140 may determine whether a fluid two-phase interface 610 is located between the respective portions 202-2 and 202-3 to which the flowmeter assemblies 132-2 and 132-3 are exposed based on determining whether a difference between the respective first and second temperatures measured by the respective first and second temperature sensors of adjacent flowmeter assemblies at least meet a threshold value. In some example embodiments, the control system 140 determines an average temperature value of the first and second temperatures measured by respective first and second temperature sensors of each flowmeter assembly. The control system 140 may determine temperature differences between the average temperatures of each of the adjacent flowmeter assemblies 132-1 to 132-N in the thermal monitoring array 130.

In some example embodiments, a magnitude temperature difference between temperatures measured by first and second temperature sensors 412 and 422 in a given flowmeter assembly 132-1 to 132-N may vary based on the phase of the coolant fluid circulating in flow communication with the flowmeter assembly. Such a variation in temperature difference magnitude may be based on different heat transfer coefficients of the coolant fluid in different phases.

In some example embodiments, the control system 140 may determine that a given flowmeter assembly 132-1 is exposed to a gas-phase coolant fluid 604 based on determining that a temperature difference $\Delta T$ determined from temperature data generated by the given flowmeter assembly 132-1 exceeds a threshold value associated with being exposed to the gas-phase fluid 604. The threshold value may be a stored value, an experimentally-determined value, some combination thereof, etc.

In some example embodiments, the control system 140 may determine that a fluid two-phase interface 610 is located between adjacent flowmeter assemblies 132-1 to 132-N based on determining that a difference between the magnitudes of respective temperature difference $\Delta T$ values determined from temperature data generated by the respective flowmeter assemblies exceeds a threshold value associated with the interface 610 being located between the adjacent flowmeter assemblies. The threshold value may be a stored value, an experimentally-determined value, some combination thereof, etc.

For example, the control system 140 may determine that a fluid two-phase interface 610 is not located between flowmeter assemblies 132-2 and 132-3 based on determining that a temperature difference between temperatures measured by the adjacent flowmeter assemblies 132-2 and 132-3 is less than a threshold value. In another example, the control system 140 may determine that the fluid two-phase interface 610 is located between flowmeter assemblies 132-1 and 132-2 based on determining that a temperature difference between temperatures measured by the adjacent flowmeter assemblies 132-1 and 132-2 at least meets a threshold value.

In some example embodiments, the control system 140 monitors the location (i.e., level) of the fluid two-phase interface 610 in the downcomer flow channel 112 over time. The control system 140 may control coolant fluid 122 flow rates based on the determined location of the fluid two-phase interface 610. For example, the control system 140 may control coolant fluid 122 flow rate through the downcomer flow channel 112 to maintain the location of the fluid two-phase interface 610 within a certain range of locations (i.e. a certain range of levels) within the downcomer flow channel 112. In response to the location of the fluid two-phase interface 610 being below a threshold level, the control system 140 may determine that an anomalous condition is present and may take responsive action, including activating an alarm, generating a warning signal that is transmitted to an operator, etc. As a result, nuclear reactor operations may be improved based on improved monitoring of temperatures of coolant fluid 122 flowing through the nuclear reactor 102.

In some example embodiments, the control system 140 may control coolant 122 flow rate based on a relationship between a coolant circulation pump power and the determined location of the fluid two-phase interface 610. The relationship may be stored in a lookup table, where the associated values in the lookup table may be determined experimentally. The control system 140 may determine a circulation pump power value based on a determined location of the fluid two-phase interface 610 and the lookup table. The control system 140 may control the supply of electrical power to a circulation pump according to the determined circulation pump power value, so that the amount of electrical power supplied to the circulation pump substantially corresponds to the determined circulation pump power value. The amount of power supplied to the circulation pump may be experimentally correlated with the flow rate of coolant 122.

In some example embodiments, the control system 140 may monitor a temperature distribution of coolant fluid 122 in the downcomer flow channel 112 based on temperature data generated by the flowmeter assemblies 132-1 to 132-N.

Based on processing temperature data generated by axially-separated and azimuthally-separated flowmeter assemblies 132-1 to 132-N, the control system 140 may determine temperatures of coolant fluid 122 at different axial and azimuthal portions 202-1 to 202-N of the downcomer flow channel 112.

The control system 140 may also determine temperatures of coolant fluid 122 at different axial and azimuthal portions 202-1 to 202-N the downcomer flow channel 112 based on determining the portions 202-1 to 202-N to which each of the flowmeter assemblies 132-1 to 132-N are exposed.

The control system 140 may determine a distribution of coolant fluid 122 temperature throughout the downcomer flow channel 112, where the distribution is at least one of an axial and an azimuthal distribution of temperature through the various azimuthally-separate and axially-separate portions 202-1 to 202-N of the downcomer flow channel 112.

In some example embodiments, the control system 140 may monitor a temperature distribution of coolant fluid 122 through the downcomer flow channel 112 to monitor for anomalous conditions in the downcomer flow channel 112. For example, the control system 140 may determine that an anomalous condition in the nuclear reactor 102 is present when a temperature of coolant 122 in a particular axial, azimuthal portion 202-1 to 202-N of the downcomer flow channel 112 at least meets a threshold magnitude of different from temperatures at different azimuthal locations in the same axial portion 202-1 to 202-N of the downcomer flow channel 112. As a result, nuclear reactor operations may be improved based on improved monitoring of temperatures of coolant fluid 122 flowing through the nuclear reactor 102.

In some example embodiments, the control system 140 may determine a temperature distribution that is restricted to one of an axial distribution and an azimuthal distribution of coolant fluid 122 temperatures through the portions 202-1 to 202-N of the downcomer flow channel 112. For example, the temperature of coolant 122 flowing through the downcomer flow channel 112 may be uniform and/or substantially uniform at different azimuthal portions of a substantially similar axial portion 202-1 to 202-N of the downcomer flow channel 112. As a result, the temperature of the coolant 122 may generally vary with axial portion 202-1 to 202-N (i.e. level) of the downcomer flow channel 112. The control system 140 may determine a temperature distribution of coolant 122 in the downcomer flow channel 112 based on averaging temperatures measured by flowmeter assemblies 132-1 to 132-N located at common axial locations in the downcomer assemblies. The control system 140 may thus determine an axial temperature distribution of coolant fluid 122 temperatures through the axially-separate portions 202-1 to 202-N of the downcomer flow channel 112.

In some example embodiments, the control system 140 may monitor changes in coolant fluid 122 subcooling, identify abnormal conditions (e.g., coolant fluid 122 leakage from the downcomer flow channel 112, temperature disturbances within the downcomer flow channel 112, etc.), and some combination thereof based on comparing the temperature data at different axial locations, azimuthal locations, etc. in the downcomer flow channel 112. In some example embodiments, the control system 140 may monitor coolant fluid 122 flow in the downcomer flow channel 112 based on comparing temperatures determined for each of the axial, azimuthal locations in the downcomer flow channel 112 with historical temperature data for one or more of the axial, azimuthal locations in the downcomer flow channel 112.

In some example embodiments, azimuthally-asymmetric coolant fluid 122 through separate portions 202-1 to 202-N of the downcomer flow channel 112 may result in asymmetric heat rejection by different portions of the nuclear reactor core 104. Controlling a coolant fluid 122 flow rate through separate portions 202-1 to 202-N of the downcomer flow channel 112 based on monitoring the temperature distribution of coolant fluid 122 flowing through separate portions 202-1 to 202-N of the downcomer flow channel 112 may reduce such asymmetry, thereby improving nuclear reactor operations.

Figure 7:
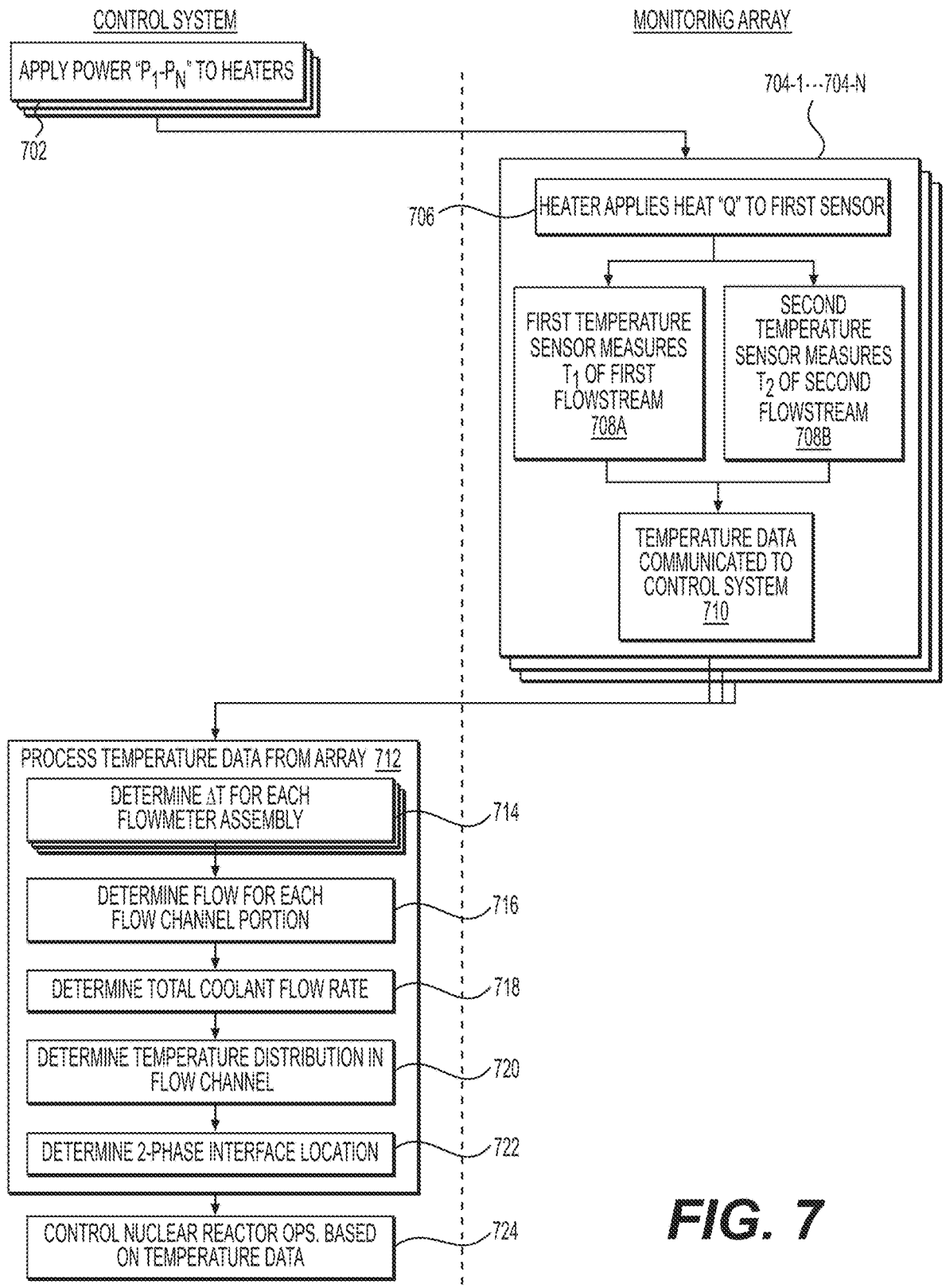
FIG. 7 illustrates monitoring coolant fluid flow in a downcomer flow channel of a nuclear reactor through the thermal monitoring array, according to some example embodiments.

FIG. 7 illustrates monitoring coolant fluid flow in a downcomer flow channel of a nuclear reactor through the thermal monitoring array, according to some example embodiments. The monitoring may be implemented by the control system included in any embodiments herein and flowmeter assemblies included in any embodiments of thermal monitoring arrays herein. The monitoring may be implemented with regard to any embodiment of thermal monitoring array 130 included herein.

Referring to FIG. 7, at 702, at least one control system 140 supplies a magnitude "P" of electrical power to the heating elements 416 included in each of the flowmeter assemblies 132-1 to 132-N. The power supplied to the respective heating elements 416 included in each of the flowmeter assemblies 132-1 to 132-N may be expressed as $P_1$ to $P_N$. The control system 140 may monitor the magnitude of electrical power $P_1$ to $P_N$ supplied to the heating elements 416 over time.

At 704-1 to 704-N, each of the flowmeter assemblies 132-1 to 132-N in a thermal monitoring array generate at least first and second temperature data. Steps 704-1 to 704-N each include steps 706-710. Each of steps 704-1 to 704-N may be implemented in parallel with regard to of the flowmeter assemblies 132-1 to 132-N of the thermal monitoring array 130.

At 706, a heating element 416 included in a given flowmeter assembly of the flowmeter assemblies 132-1 to 132-N generates heat $Q_H$ based on the supplied electrical power $P_1$ to $P_N$. The heat $Q_H$ is transmitted to a directly coupled first temperature sensor 412 of the given flowmeter assembly across an interface 414. The interface 414 has a surface area "A".

At 708A, the first temperature sensor 412 of the given flowmeter assembly measures a first temperature $T_1$ based on both 1) a temperature $T_{env}$ of coolant fluid flowing in a first flowstream to which the first temperature sensor 412 is exposed and 2) the transmitted heat $Q_H$.

At 708B, a second temperature sensor 422 of the given flowmeter assembly measures a second temperature $T_2$ based on a temperature $T_{env}$ of coolant fluid flowing in a second flowstream to which the second temperature sensor 422 is exposed. The first and second temperature sensors 412 and 422 of the given flowmeter assembly may generate respective first and second temperature data based on the respective measured first and second temperatures $T_1$ and $T_2$.

At 710, the first and second temperature sensors 412 and 422 included in the given flowmeter assembly communicate the first and second temperature data to the control system 140.

As shown, at least first and second temperature data is communicated from each of the flowmeter assemblies 132-1 to 132-N to at least one control system 140.

At 712, the control system 140 processes first and second temperature data received from each of the flowmeter assemblies 132-1 to 132-N of the thermal monitoring array 130.

At 714, the control system 140 determines a temperature difference ($T_1-T_2$) for each of the flowmeter assemblies 132-1 to 132-N. Each temperature difference is determined based on at least one first temperature and at least one second temperature indicated by the first and second temperature data received from a respective flowmeter assembly of the flowmeter assemblies 132-1 to 132-N.

At 716, the control system 140 determines flow rates 216-1 to 216-N for the portions 202-1 to 202-N of the downcomer flow channel 112 to which the separate flowmeter assemblies 132-1 to 132-N are exposed. Each of the flow rates 216-1 to 216-N may be a separate set of one or more of the flow rates 450 determined for the separate flowmeter assemblies 132-1 to 132-N. The control system 140 may determine flow rates 450 through each of the portions 202-1 to 202-N based on one or more temperature differences determined for one or more of the flowmeter assemblies 132-1 to 132-N exposed to each of the portions 202-1 to 202-N. As described above, in some example embodiments, the control system 140 may determine flow rates 216-1 to 216-N based on the determined temperature differences and a lookup table ("LUT") storing an array of associated temperature difference values and flow rate values.

In some example embodiments, the control system 140 determines flow rates 216-1 to 216-N for each of the azimuthally-separate portions 202-1 to 202-N of the downcomer flow channel 112 based on flow rates 450 determined for multiple flowmeter assemblies 132-1 to 132-N exposed to different axial portions of the downcomer flow channel 112 within each of the azimuthally-separate portion 202-1 to 202-N. For example, the control system 140 may determine a flow rate 216-1 for a given azimuthal portion 202-1 of the downcomer flow channel 112 based on an average of flow rates 450 determined for different axial portions of the downcomer flow channel 112 within the given azimuthal portion 202-1.

At 718, the control system 140 determines a total flow rate of coolant fluid 122 through the downcomer flow channel 112 based on the flow rates 216-1 to 216-N of coolant fluid 122 through each of the separate portions 202-1 to 202-N of the downcomer flow channel 112. The total flow rate may be a sum of the determined flow rates 216-1 to 216-N.

At 720, the control system 140 determines a temperature distribution of coolant fluid flowing through separate portions 202-1 to 202-N of the downcomer flow channel 112 based on the temperature data. The control system 140 may compare temperature data generated by flowmeter assemblies 132-1 to 132-N exposed to different portions 202-1 to 202-N of the downcomer flow channel 112 to determine temperature trends over different portions of the downcomer flow channel 112. For example, the control system 140 may determine temperature distributions across different axial and azimuthally-separate portions 202-1 to 202-N of the downcomer flow channel 112 based on temperature data received from separate flowmeter assemblies 132-1 to 132-N exposed to separate portions 202-1 to 202-N of the downcomer flow channel 112.

At 722, the control system 140 determines a location of a fluid two-phase interface 610 in the downcomer flow channel 112. The fluid two-phase interface 610 location may be a level of a liquid coolant fluid 122 in the downcomer flow channel 112. The control system 140 may process temperature data generated by different flowmeter assemblies 132-1 to 132-N to determine a phase of the fluid included in the separate portions 202-1 to 202-N to which each of the flowmeter assemblies 132-1 to 132-N is exposed.

At 724, the control system 140 controls one or more nuclear reactor operations based on the temperature data. Such control may include controlling one or more nuclear reactor operations based on at least one of the determined coolant fluid 122 flow rate, the determined temperature distribution, and the determined fluid two-phase interface 610 location. Controlling one or more nuclear reactor operations may include controlling heat rejection by a nuclear reactor core 104. The control system 140 may control a flow rate of coolant fluid 122 through the nuclear reactor 102 to control heat rejection by the nuclear reactor core 104.

For example, based on the determined core flow of coolant fluid 122, the control system 140 may adjust coolant fluid 122 flow to increase nuclear reactor performance. Coolant fluid 122 flow may be controlled based on controlling one or more coolant fluid pumps, valves, nozzles, etc.

As described above, in some example embodiments, the control system 140 may control a flow rate of coolant fluid 122 according to at least one of the determined coolant fluid 122 flow rate, the determined temperature distribution, and the determined fluid two-phase interface 610 location and a lookup table ("LUT") that associates the respective at least one of the determined coolant fluid 122 flow rate, the determined temperature distribution, and the determined fluid two-phase interface 610 location with a corresponding circulation pump power value. The control system 140 may control a supply of electrical power to a circulation pump such that an amount of electrical power supplied to the circulation pump substantially corresponds to the determined corresponding circulation pump power value.

In some example embodiments, controlling one or more nuclear reactor operations includes executing a responsive action based on identifying an anomalous condition in the nuclear reactor 102. The control system 140 may identify an anomalous condition based on one or more of coolant fluid 122 flow rate, coolant fluid 122 temperature distribution, fluid two-phase interface 610 location in the downcomer flow channel 112, etc. A responsive action may include at least one of activating an alarm, generating a message to an operator, and alerting another control system.

The following is a summary of the various features and advantages of a nuclear reactor configured to enable monitoring of coolant fluid circulation through a downcomer flow channel defined in the nuclear reactor, although it should be understood that the following is not an exhaustive list.

The nuclear reactor may include a thermal monitoring array that includes one or more flowmeter assemblies. The flowmeter assemblies may be coupled to one or more surfaces of a downcomer assembly in the nuclear reactor such that the flowmeter assemblies are exposed to different portions of the downcomer flow channel. The flowmeter assemblies may each generate temperature data based on measuring temperatures of one or more flowstreams through the respective flow channel portions to which the flowmeter assemblies are exposed.

The temperature data may be received at a control system and processed thereby to determine a mass flow rate of coolant fluid through the downcomer flow channel. Based on determining the flow rate through the downcomer flow channel, the control system may monitor the core flow of coolant fluid in the nuclear reactor. Based on monitoring the core flow, the control system may adjust coolant fluid flow to improve nuclear reactor performance. As a result, the thermal monitoring array may enable improved nuclear reactor operations.

Because the flowmeter assemblies include temperature sensors and heating elements that may omit moving parts, the thermal monitoring array may enable improved nuclear reactor durability relative to a nuclear reactor that includes moving components via which coolant fluid core flow may be determined (i.e., a pump).

Based on monitoring temperature data generated by separate flowmeter assemblies of the thermal monitoring array, the control system may determine and monitor temperature distributions of coolant fluid through axially-separate and azimuthally-separate portions of the downcomer flow channel. As a result, the control system may identify temperature anomalies in the downcomer flow channel and may take corrective responsive action. As a result, the thermal monitoring array may enable anomalous thermal conditions in the nuclear reactor to be identified. Furthermore, the thermal monitoring array may enable an axial and azimuthal location of thermal anomalies in the nuclear reactor to be identified with improved precision. As a result to be nuclear reactor operations may be improved.

Based on monitoring temperature data generated by separate flowmeter assemblies of the thermal monitoring array, the control system may determine and monitor a location of a fluid two-phase interface in the downcomer flow channel. Such a two-phase interface, including a surface level of liquid coolant fluid in the downcomer flow channel, may be identified based on differences between temperature data generated by axially-separate flowmeter assemblies. Based on monitoring the location of the two-phase interface, the control system may identify anomalous conditions related to the liquid coolant fluid level in the nuclear reactor and may take responsive actions. As a result, nuclear reactor operations may be improved based on the thermal monitoring array enabling fluid two-phase interface locations in the nuclear reactor to be identified and monitored over time.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims. In addition, while processes have been disclosed herein, it should be understood that the described elements of the processes may be implemented in different orders, using different selections of elements, some combination thereof, etc. For example, some example embodiments of the disclosed processes may be implemented using fewer elements than that of the illustrated and described processes, and some example embodiments of the disclosed processes may be implemented using more elements than that of the illustrated and described processes.

What is claimed is:

1. An apparatus within a nuclear reactor, comprising:
a flowmeter assembly configured to be coupled to at least one surface such that the flowmeter assembly is exposed to at least one first portion of a flow channel, the flowmeter assembly being configured to monitor a flow of a coolant fluid in the at least one first portion of the flow channel, the flowmeter assembly including
a first temperature sensor configured to generate first temperature data based on measuring a first temperature of a first flowstream of the coolant fluid in the at least one first portion of the flow channel;
a heating element directly coupled to the first temperature sensor at an interface of the first temperature sensor such that the heating element is configured to apply heat to the first temperature sensor through the interface;
a second temperature sensor configured to generate second temperature data based on measuring a second temperature of a second flowstream of the coolant fluid in the at least one first portion of the flow channel, the first flowstream and the second flowstream running parallel to each other within the at least one first portion of the flow channel, the second temperature sensor being spaced apart from the heating element, and the second temperature sensor being at least partially insulated from the heating element so that the second temperature data generated by the second temperature sensor is independent of heat generated by the heating element; and
a control system including a memory and a processor, the memory storing non-transitory computer-readable instructions, the processor configured to read the non-transitory computer-readable instructions in order to
calculate a flowrate of the coolant fluid in the at least one first portion based on the second temperature data and a temperature of the coolant fluid.

2. The apparatus of claim 1, wherein the first and second temperature sensors are configured to be exposed to a common flowstream.

3. The apparatus of claim 1, wherein the flowmeter assembly includes insulating material in order to at least partially insulate the second temperature sensor so that the second temperature data generated by the second temperature sensor is independent of heat generated by the heating element, the insulating material being packed around the heating element and at least a portion of the first temperature sensor.

4. The apparatus of claim 1, wherein the flowmeter assembly includes,
at least one third temperature sensor, the at least one third temperature sensor being configured to generate third temperature data based on measuring a third temperature of at least one flowstream of the coolant fluid in the flow channel, the at least one third temperature sensor being at least partially insulated from the heating element.

5. The apparatus of claim 4, wherein the at least one third temperature sensor and the second temperature sensor are configured to be exposed to at least one of
axially-separated portions of the flow channel, relative to a longitudinal axis of the flow channel; and
azimuthally-separated portions of the flow channel, relative to the longitudinal axis of the flow channel.

6. The apparatus of claim 1, further comprising: a flow channel cover configured to at least partially define the first flowstream and the second flowstream.

7. The apparatus according to claim 1, wherein the processor is further configured to calculate the flowrate by
determining a first heat flux at the second temperature sensor based on the temperature of the coolant fluid and the second temperature data, determining a second heat flux at e first temperature sensor based on the temperature of the coolant fluid, the first temperature data, and a first surface area of the interface, and calculating the flowrate based at east one on the first heat flux and the second heat flux.

8. The apparatus of claim 7, wherein the processor is further configured to calculate the flowrate by determining a heat transfer rate through the first surface area based on an electrical current being sent to the heating element, determining an equivalent heat transfer coefficient at the second temperature sensor, and calculating the flowrate based further on the heat transfer rate and the equivalent heat transfer coefficient.

9. The apparatus of claim 7, wherein the flowmeter assembly further includes insulating material between the first temperature sensor and the heating element, the insulating material being configured to insulate the first temperature sensor from the heating element.

10. The apparatus of claim 1, further comprising:

a dummy heating element directly coupled to the second temperature sensor, the dummy heating element having a same mass and thermal environment as compared to the heating element, wherein the dummy heating element is configured to not emit heat.

11. The apparatus of claim 10, wherein the heating element is positioned downstream of the first temperature sensor, relative to a direction of the flow of the coolant fluid in the first flowstream, and the dummy heating element is positioned downstream of the second temperature sensor, relative to a direction of the flow of the coolant fluid in the second flowstream.

12. The apparatus of claim 1, wherein the heating element is positioned downstream of the first temperature sensor, relative to a direction of the flow of the coolant fluid in the first flowstream.

13. The apparatus of claim 1, wherein the second temperature sensor is spaced apart from the first temperature sensor in a first direction that is perpendicular to a second direction of the flow of coolant fluid of the at least one first portion of the flow channel.

14. The apparatus of claim 13, wherein the heating element is positioned downstream of the first temperature sensor, relative to a direction of the flow of the coolant fluid in the first flowstream.

* * * * *

UNITED STATES PATENT AND TRADEMARK OFFICE
CERTIFICATE OF CORRECTION

| | |
|---|---|
| PATENT NO. | : 12,062,460 B2 |
| APPLICATION NO. | : 17/535069 |
| DATED | : August 13, 2024 |
| INVENTOR(S) | : Eric Paul Loewen et al. |

It is certified that error appears in the above-identified patent and that said Letters Patent is hereby corrected as shown below:

In the Claims

Column 31, Line 1, Claim 7, delete "e" and insert --the-- therefor.

Column 32, Line 18, Claim 13, delete "the flow of coolant fluid" and insert --the flow of the coolant fluid-- therefor.

Signed and Sealed this
Sixth Day of May, 2025

Coke Morgan Stewart
*Acting Director of the United States Patent and Trademark Office*